(12) United States Patent
Messina et al.

(10) Patent No.: US 12,068,682 B2
(45) Date of Patent: Aug. 20, 2024

(54) CONTROL METHOD AND CIRCUIT FOR PHASE SHIFT REGULATION OF INTERLEAVED CONVERTERS AT VARIABLE SWITCHING FREQUENCY

(71) Applicant: STMicroelectronics S.r.l., Agrate Brianza (IT)

(72) Inventors: Sebastiano Messina, Mascalucia (IT); Marco Torrisi, Gravina di Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 168 days.

(21) Appl. No.: 17/872,579

(22) Filed: Jul. 25, 2022

(65) Prior Publication Data

US 2024/0030807 A1 Jan. 25, 2024

(51) Int. Cl.
*H02M 1/42* (2007.01)
*H02M 1/00* (2006.01)

(52) U.S. Cl.
CPC ....... *H02M 1/4233* (2013.01); *H02M 1/0043* (2021.05)

(58) Field of Classification Search
CPC .......................... H02M 1/0043; H02M 1/4233
See application file for complete search history.

(56) References Cited

U.S. PATENT DOCUMENTS 5,793,191 A 8/1998 Elmore et al.
8,975,855 B2 3/2015 Gerdes et al.
(Continued)

FOREIGN PATENT DOCUMENTS

CN 103684008 B 3/2016
CN 208581166 U 3/2019
(Continued)

OTHER PUBLICATIONS

Schellekens, J.M., et al: "Interleaved Switching of Parallel ZVS Hysteresis Current Controlled Inverters," 2010 International Power Electronics Conference, IEEE, pp. 2822-2829.
(Continued)

*Primary Examiner* — Kyle J Moody
*Assistant Examiner* — Lakaisha Jackson
(74) *Attorney, Agent, or Firm* — Crowe & Dunlevy LLC

(57) ABSTRACT

Uncompensated upper and lower reference-currents are generated for first and second branches of a high-frequency half-bridge within an interleaved-totem-pole PFC. A first control-signal for the first branch is generated from comparison between an inductor-current and uncompensated reference-currents for the first branch, a first timing-reference is generated from the first control-signal from a number of active branches, a compensated upper reference-current is generated for the second branch by adding a first compensation-current to the uncompensated upper reference-current for the second branch, a compensated lower reference-current is generated for the second branch by subtracting the first compensation-current from the uncompensated lower reference-current for the second branch, a second control-signal is generated for the second branch from the compensated reference-currents for the second branch, a first timing-difference is generated from a phase-difference between the first and second control-signals, and the first compensation-current is generated from a difference between the first timing-reference and timing-difference.

20 Claims, 17 Drawing Sheets

(56) References Cited

U.S. PATENT DOCUMENTS

| | | | |
|---|---|---|---|
| 9,653,995 B2 | 5/2017 | Siehl et al. | |
| 2011/0149622 A1* | 6/2011 | Lin | H02M 1/4208 |
| | | | 363/124 |
| 2011/0316497 A1* | 12/2011 | Sardat | H02M 3/1584 |
| | | | 323/235 |
| 2021/0226528 A1* | 7/2021 | Gu | H02M 1/0043 |
| 2022/0310303 A1* | 9/2022 | Wang | H01F 37/00 |
| 2023/0074022 A1* | 3/2023 | Zhou | H02M 1/4258 |
| 2023/0222384 A1* | 7/2023 | Shao | G06Q 50/06 |
| | | | 702/187 |

FOREIGN PATENT DOCUMENTS

| | | |
|---|---|---|
| CN | 107276443 B | 10/2019 |
| CN | 111193391 B | 7/2021 |
| EP | 3460973 A1 | 3/2019 |

OTHER PUBLICATIONS

ON Semiconductor: NCP1632-D, Power Factor Controller, Interleaved, 2-Phase, Apr. 2020—Rev. 7, 27 pgs.
Texas Instruments UCC28064A Natural Interleaving™ Transition-Mode PFC Controller with High Light-Load Efficiency (Datasheet).
ON Semiconductor NCP1632: Interleaved, 2-Phase Power Factor Controller (Datasheet), Dec. 2018—Rev. 6, 26 pgs.
J. Biela, D. Hassler, J. Minibock and J.W. Kolar, "Optimal Design of a 5kW/dm3 / 98.3% Efficient TCM Resonant Transition Single-Phase PFC Rectifier", The 2010 International Power Electronics Conference.

\* cited by examiner

CONTROL METHOD AND CIRCUIT FOR PHASE SHIFT REGULATION OF INTERLEAVED CONVERTERS AT VARIABLE SWITCHING FREQUENCY

TECHNICAL FIELD

This disclosure is related to the field of regulation of interleaved power factor correction circuits and, in particular, to a control method for phase shift regulation of interleaved power factor correction circuits that permits operation at a variable switching frequency and with different numbers of active channels.

BACKGROUND

The power factor of an AC power system is defined as the ratio of the real power absorbed by the load to the apparent power flowing in the load. Due to energy stored in the load and returned to the AC source, or due to a non-linear load that distorts the wave shape of the current drawn from the AC source, the apparent power may be greater than the real power, with the result being that more current flows in the load than would be utilized to transfer real power alone. A load with a low power factor therefore draws more current than a load with a high power factor, for the same amount of useful power transferred. Power-factor correction (PFC) is accordingly utilized to increase the power factor of a load, improving efficiency for the distribution system to which the load is attached.

The advent of wide-bandgap (WBG) semiconductors—such as gallium nitride (GaN) and silicon carbide (SiC)—has enabled the implementation of bridgeless topologies, such as the "totem-pole" design. A sample bridgeless totem-pole design is illustrated in FIG. 1A, in which a first branch (including transistors SD1, SD2) and a second branch (including transistors Q1, Q2) are connected in parallel, with different terminals of an AC source being connected to the taps between the transistors of the branches. The first branch commutates at the frequency of the AC source, rectifying the input voltage. The second branch commutates at high frequency, shaping the current while stepping up the voltage.

To improve the efficiency of bridgeless totem-pole PFC, additional high-frequency branches can be added to create an "interleaved" totem-pole PFC, such as shown in FIG. 1B. Here, an additional high frequency branch (including transistors Q3, Q4) has been added, and helps reduce output voltage ripple, while reducing the per-branch power requirements on the transistors, helping to reduce overall layout size and cost. The different high frequency branches may be referred to as channels.

In such interleaved totem-pole PFC topologies, the high frequency branches operate at the same switching frequency, with the drive signals for the different high frequency branches being phase-shifted with respect to one another. For fixed frequency operation, setting the phase shift between high frequency branches is easy because the switching period is known and constant.

However, for variable frequency operation, the switching frequency changes continuously. The interleaving functionality becomes complicated because it is not possible to know the instantaneous switching period as the instantaneous switching period is dependent on instantaneous input/output conditions, and because the instantaneous switching period depends on the tolerances of passive components such as inductors and capacitors. Due to this, the switching period and therefore phase shift are to be measured/calculated (and corrected) on a cycle-by-cycle basis. A variety of approaches have been attempted in the prior art, with varying degrees of success.

The data sheet numbered UCC28064, entitled "Natural Interleaving™ transition-mode PFC controller with high light-load efficiency", Texas Instruments, 2019 (incorporated by reference), describes a two-channel interleaved transition mode PFC controller at variable frequency. The interleaving technique here is a natural interleaving technique, with both channels being operated as a master. The channel synchronization and the correct phase shift (180°) is obtained by modulating the ON-times of both channels. However, in case of unbalanced inductors, the ON-time modulation can cause unbalanced current in the inductors and higher losses in the system.

The data sheet numbered NCP1632, entitled "Power Factor Controller, Interleaved, 2-Phase", ON Semiconductor, 2020 (incorporated by reference), describes a Transition Mode/Discontinuous Conduction Mode Interleaved, 2-Phase Power Factor Controller operating at variable frequencies. The interleaving function is realized by incorporating the ON-time modulation and the dead-time in order to control the turn-on instant of the channel that is to be synchronized. This method extends the use of this controller to systems that work in Discontinuous Conduction Mode. Using this method, however, in the case of unbalanced inductors, the applied dead-time may force operation of the switch in Discontinuous Conduction Mode, worsening the harmonic content and increasing the peak current. This may lead to an increase in conduction and switching losses.

"Optimal Design of a 5 kW/dm3/98.3% Efficient TCM Resonant Transition Single-Phase PFC Rectifier" by Biela, et al., published by the International Power Electronics Conference, 2010 (incorporated by reference), teaches the application of a zero voltage switching (ZVS) technique for PFC control. This method is based on the determination of the instant of zero crossing of the inductor current and consequently on the calculation/adjustment of the involves times (conduction time Ton, reverse time Tr and dead times). The described method, however, utilizes powerful/expensive digital signal processors (DSPs) and/or complex programmable logic devices (CPLDs) and/or field programmable gate arrays (FPGAs).

In U.S. Pat. No. 5,793,191 (incorporated by reference), the phase angle between the switching of master channel and a slave channel is fixed and is equal to M*360/N where N is the total number of channel and M is an integer M=1, . . . , N−1. The phase shift between the channels is therefore fixed. For example, if N=3, the phase shift between channels is 0°, 120° and 240°. The phase shifts are correct when all channels are enabled. However, in case of two of the three channels being enabled, the phase shift is still 120° (instead of 180°). This causes an issue, because the total inductor ripple current is not minimized, sacrificing the benefits of interleaving technique.

In each of the above prior art approaches, the interleaved function is performed by adjusting times, and the inductor current control is performed using dissipative shunt resistors and zero crossing detect (ZCD)/zero voltage switching (ZVS) circuits, which are to be precise for correct timing adjustment. To achieve this precision, expensive components such as DSPs, CPLDs, and/or FPGAs are utilized.

As such, further development is still needed in order to address this drawback as well as the other drawbacks described above.

SUMMARY

This disclosure is represented most broadly by a method of performing hysteresis current control on a power factor correction (PFC) circuit. The method includes supplying a first AC input mains signal to N taps through N respective inductors, each tap being between switches of a different one of N branches of a high-frequency half bridge, wherein N is an integer that is greater than or equal to two. A second AC input mains signal is supplied to a tap between switches of a low-frequency half-bridge. Uncompensated lower reference currents are generated for the N branches. Uncompensated upper reference currents are generated for the N branches. A first control signal is generated for the switches of a first of the N branches, the first control signal being based upon a comparison between an inductor current through a first of the N inductors and firsts of the N uncompensated upper and lower reference currents. An additional control signal is generated for the switches of the low-frequency half-bridge. A first timing reference is generated from the first control signal based upon a number of active slave branches, the branches of the N branches other than the first branch being slave branches.

For each slave branch, the method includes generating a compensated upper reference current by adding a respective compensation current to the uncompensated upper reference current for that slave branch, and generating a compensated lower reference current by subtracting the compensation current from the uncompensated lower reference current for that slave branch, wherein the control signal for that slave branch is generated based upon a comparison between an inductor current through an associated one of the N inductors and the compensated upper and lower reference currents for that slave branch. For each slave branch, the methods further includes generating a timing difference based upon a phase difference between the first control signal and the control signal for that slave branch, and generating the compensation current based upon a difference between the first timing reference and the timing difference.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein. Do note that in the below description, any described resistor or resistance is a discrete device unless the contrary is stated, and is not simply an electrical lead between two points. Thus, any described resistor or resistance coupled between two points has a greater resistance than a lead between those two points would have, and such resistor or resistance cannot be interpreted to be a lead. Similarly, any described capacitor or capacitance is a discrete device unless the contrary is stated, and is not a parasitic unless the contrary is stated. Moreover, any described inductor or inductance is a discrete device unless the contrary is stated, and is not a parasitic unless the contrary is stated.

The aim of this disclosure will first be described in general, and thereafter specific embodiments and the operation thereof will be described in detail.

Figure 1A:
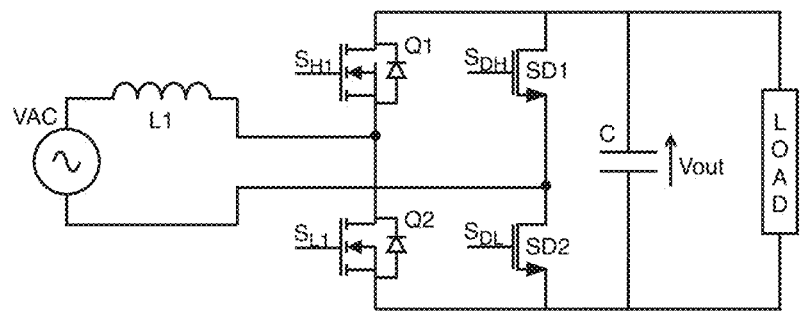
FIG. 1A is a schematic diagram of a prior art totem-pole PFC circuit.
Figure 1B:
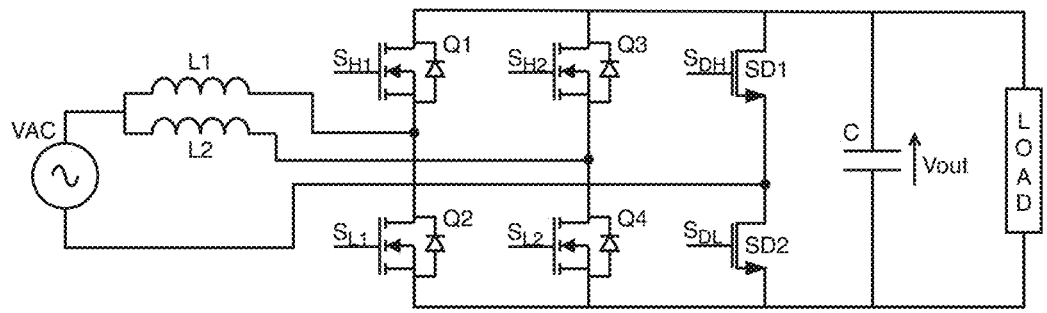
FIG. 1B is a schematic diagram of a prior art interleaved totem-pole PFC circuit.
Figure 2:
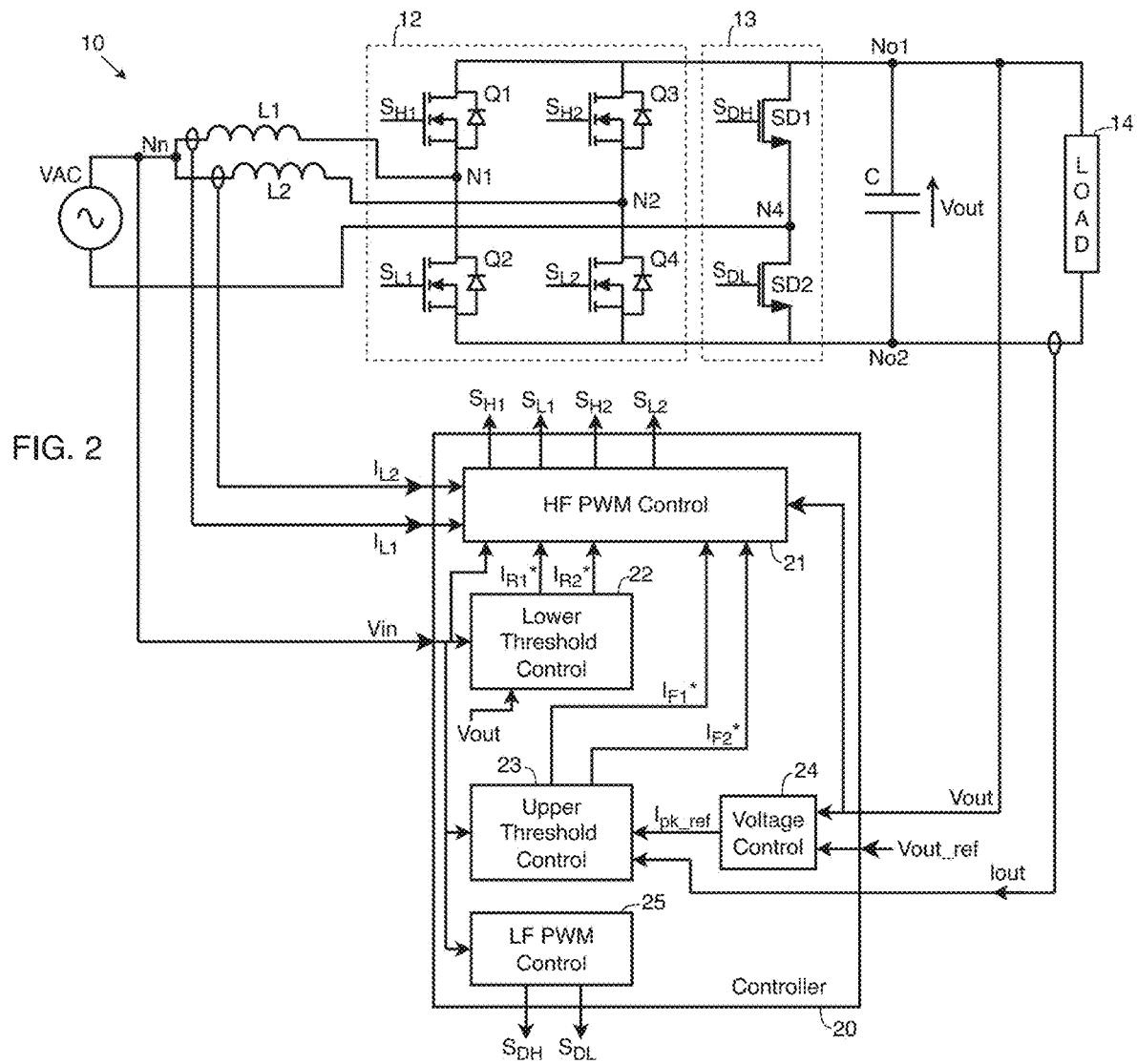
FIG. 2 is a schematic block diagram of an interleaved totem-pole PFC circuit disclosed herein.

In general, disclosed herein is a control system for an interleaved totem-pole PFC topology. See, for example, the interleaved totem-pole PFC circuit 10 of FIG. 2, which includes a high-frequency bridge 12 and a low-frequency bridge 13 connected in parallel with a tank capacitor C and a load 14 between output nodes No1, No2. Inductors L1, L2 are each connected to a first terminal of an AC voltage source VAC (e.g., AC input mains) at node Nn. A different current sensor is connected between each inductor L1 and L2 and node Nn to permit a controller, described below, to sense inductor currents $I_{L1}$, $I_{L2}$. The inductors L1, L2 are respectively connected to taps N1, N2 within the high-frequency bridge 12—the interleaved totem-pole PFC in this example has two interleaved channels (the first being formed by transistors Q1, Q2 and the second being formed by transistors Q3, Q4). The second terminal of the AC voltage source VAC is connected to the tap N4 within the low-frequency bridge 13. A controller 20 controls the transistors of the high-frequency bridge 12 and low-frequency bridge 13.

Disregarding further details of the interleaved totem-pole PFC circuit 10 for the moment, the controller 20 serves to switch the transistors of the interleaved totem-pole PFC so as to keep the associated inductor currents $I_{L1}$, $I_{L2}$ for each high-frequency branch between upper and lower thresholds, with the switching period being proportional to the difference between the upper and lower thresholds. A compensation factor is added to one or both of the upper and lower thresholds in order to adjust the frequency of, and consequently the phase shift between, the drive signals for the transistors so as to achieve interleaving functionality with the proper phase shift regardless of which channels of the high-frequency bridge 12 are activated.

In these examples, the first channel (formed by Q1, Q2) is selected as master, and its current thresholds levels are taken as a reference for the threshold comparisons performed on the slave channel (formed by Q3, Q4). To define terms that will be used herein: Tsw is the switching period of the driving signal $S_{L1}$ for the transistor Q2 of the master; $T\varphi$ is the time difference between the driving signal $S_{L1}$ for Q2 (the master) and the driving signal $S_{L2}$ for Q4 (the slave); $T\varphi ref,n$ is the reference value (desired value of $T\varphi$) for the nth slave channel, here the slave channel formed by transistors Q3, Q4, with $T\varphi ref,n=(n-1)/Nch*Tsw$ for the nth slave channel; Nch is the number of currently active interleaved channels, with $Nch=1, \ldots, Ntot$, where Ntot is the total number of channels; and the phase shift $\varphi$ can be represented in degrees as $\varphi=T\varphi*360°/Tsw$.

Figure 3:
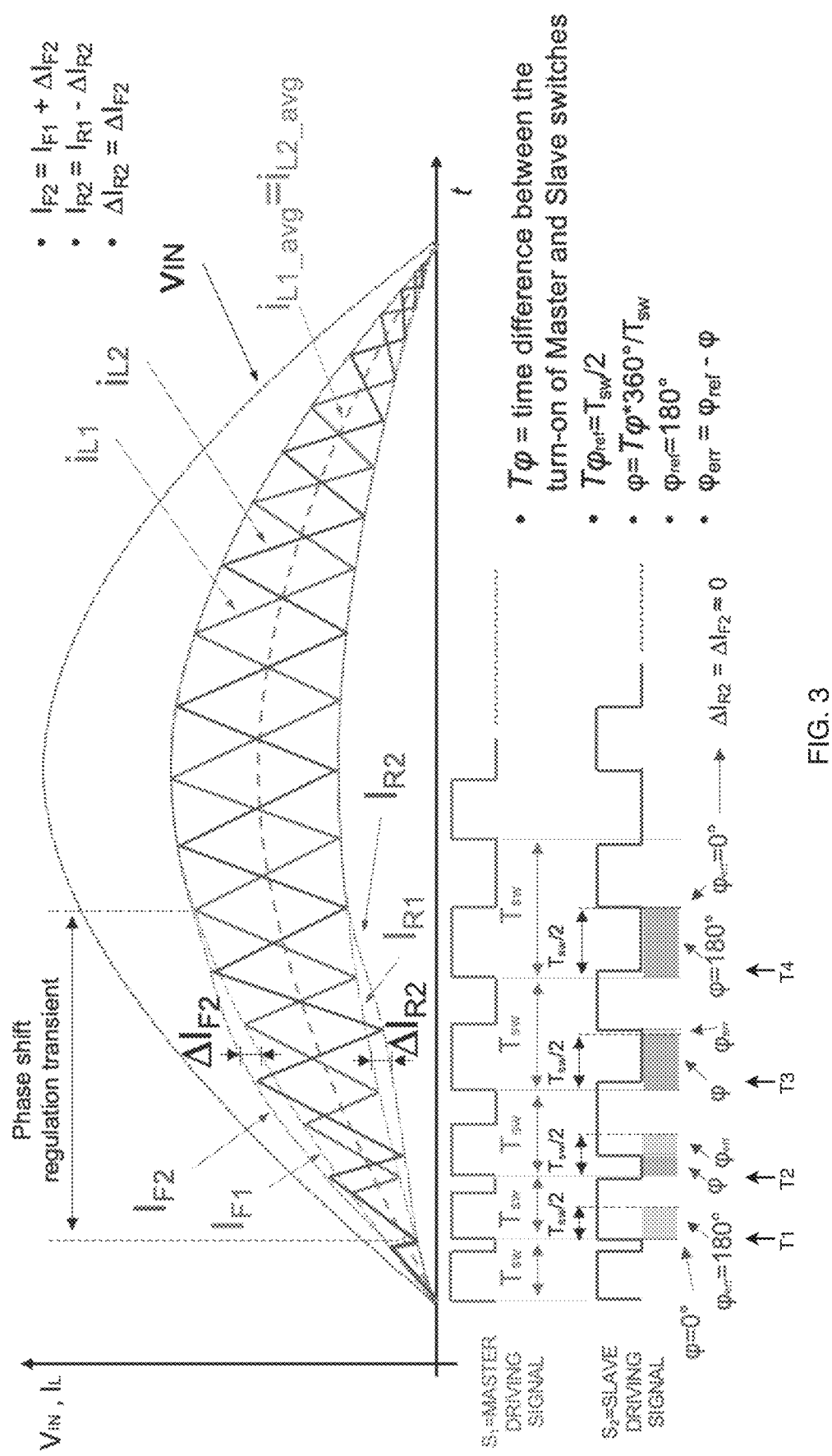
FIG. 3 is a graph showing the inductor currents of the interleaved totem-pole PFC circuit of FIG. 2 during operation in a continuous conduction mode (CCM), in the case where the inductors are balanced.

Refer now to FIG. 3, showing the results of the control scheme performed by the controller 20 on the high-frequency bridge 12. In this example, the two-channel interleaved PFC circuit 10 is operating in continuous conduction mode (CCM) with hysteresis current control, where the inductors L1, L2 are balanced (e.g., L1=L2). The upper current thresholds $I_{F1}$, $I_{F2}$ and lower current thresholds $I_{R1}$, $I_{R2}$ are set such that they define a respective sinusoidally shaped envelope for each channel. The aim of hysteresis current control is for an upper and lower current threshold to be set for each channel within the high-frequency bridge 12; the transistors for a given channel are suitably switched on when the inductor current for that channel falls below the lower current threshold, and the transistors for that channel are suitably switched off when the inductor current for that channel rises above the upper current threshold, thereby generating a variable switching frequency for the channels within the high-frequency bridge. The phase shift regulation method described in this patent can be applied to more PFC operation modes, for example: continuous conduction mode (CCM), discontinuous conduction mode (DCM), transition mode (TM) and resonant mode with zero voltage switching (ZVS) etc.

At the beginning of operation, when the inductor currents $I_{L1}$, $I_{L2}$ are both at zero, the driving signals S1, S2 (for example, corresponding to the driving signals $S_{L1}$, $S_{L2}$ that drive transistors Q2, Q4) are perfectly aligned (e.g., $T\varphi=0$), having the same switching period Tsw. The aim of the control scheme performed by the controller 20 is to obtain $T\varphi=T\varphi_{ref}=Tsw/2$ between the master channel and slave channel.

The equivalent phase shift target in degrees is $\varphi=\varphi_{ref}=180°$ and it is obtained by controlling the driving signals S1, S2 such that the error between the desired and actual phase shift is $\varphi_{err}=\varphi_{ref}-\varphi=0$. To accomplish this, compensation is performed on the slave channel by adding a compensation value $\Delta I_{F2}$ to the upper threshold $I_{F2}$ and subtracting the quantity $\Delta I_{R2}$ from the lower threshold $I_{R2}$ (determination of the compensation values $\Delta I_{F2}$, $\Delta I_{R2}$ will be described in detail below, with it being understood that $\Delta I_{F2}=\Delta I_{R2}$). These compensation values are determined based upon the phase error yen.

As can be observed, the result of this is that the phase shift error yen decreases during each cycle until it reaches 0, and the desired phase shift $\varphi=\varphi_{ref}=180°$ is accordingly obtained, as is high power factor. At this point, the inductor currents IL1, IL2 fully extend within their respective envelopes set by the upper current thresholds $I_{F1}$, $I_{F2}$ and lower current thresholds $I_{R1}$, $I_{R2}$. The instantaneous average inductor currents $I_{L1\_avg}$ and $I_{L2\_avg}$ are equal, owing to the use of the compensation values of $\Delta I_{F2}=\Delta I_{R2}$.

Figure 4:
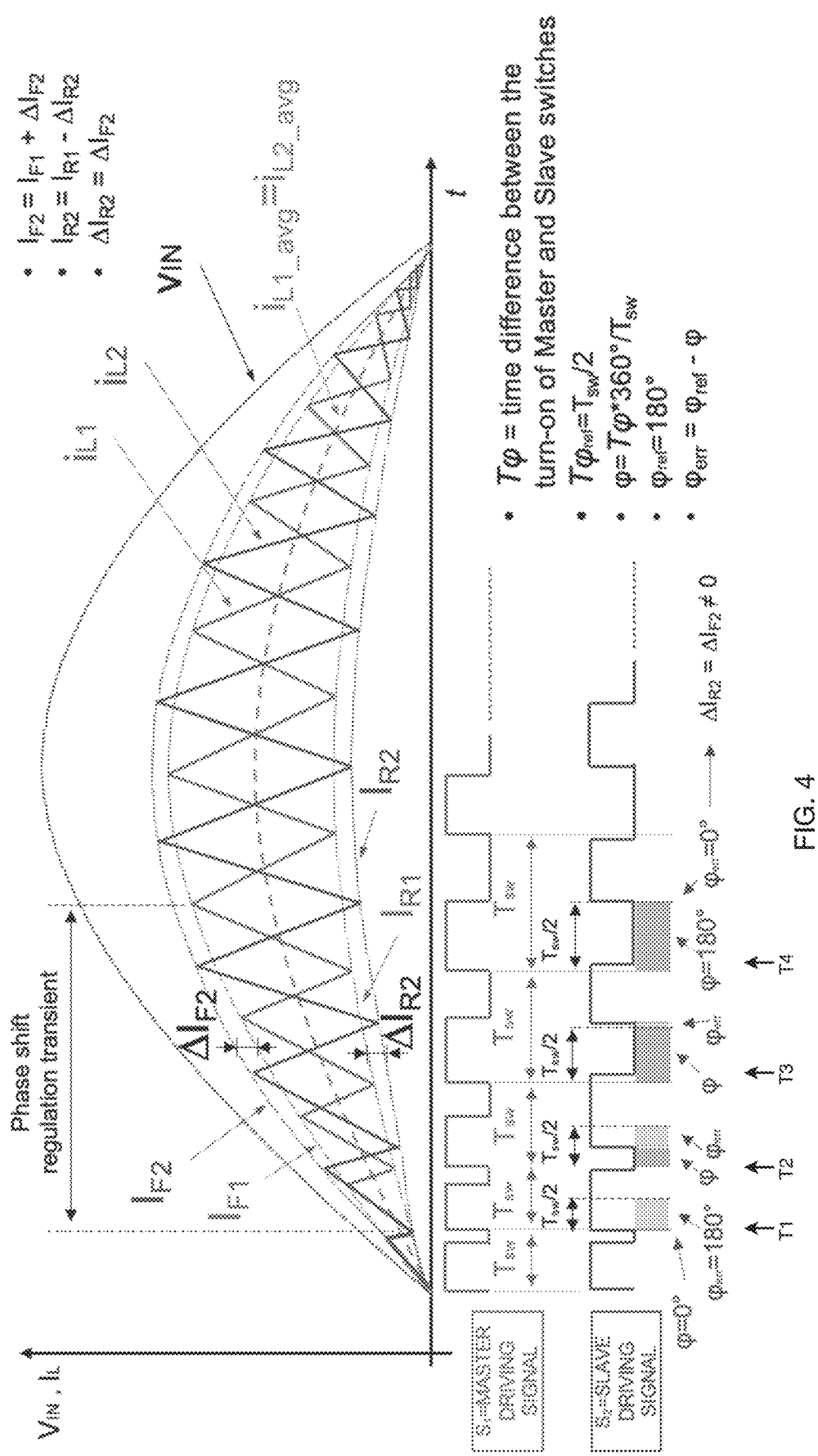
FIG. 4 is a graph showing the inductor currents of the interleaved totem-pole PFC circuit of FIG. 2 during operation in a first mode, in the case where the inductors are unbalanced.

Once the desired phase shift has been achieved, the compensation values are set to and regulated at near zero for the balanced inductor example of FIG. 3, maintaining the desired phase shift. Shown in FIG. 4 is an analogous example, but where the inductors L1, L2 are not balanced. In this example, once the desired phased shift has been achieved, the compensation values are set to different non-zero values so as to maintain the desired phase shift.

Figure 5:
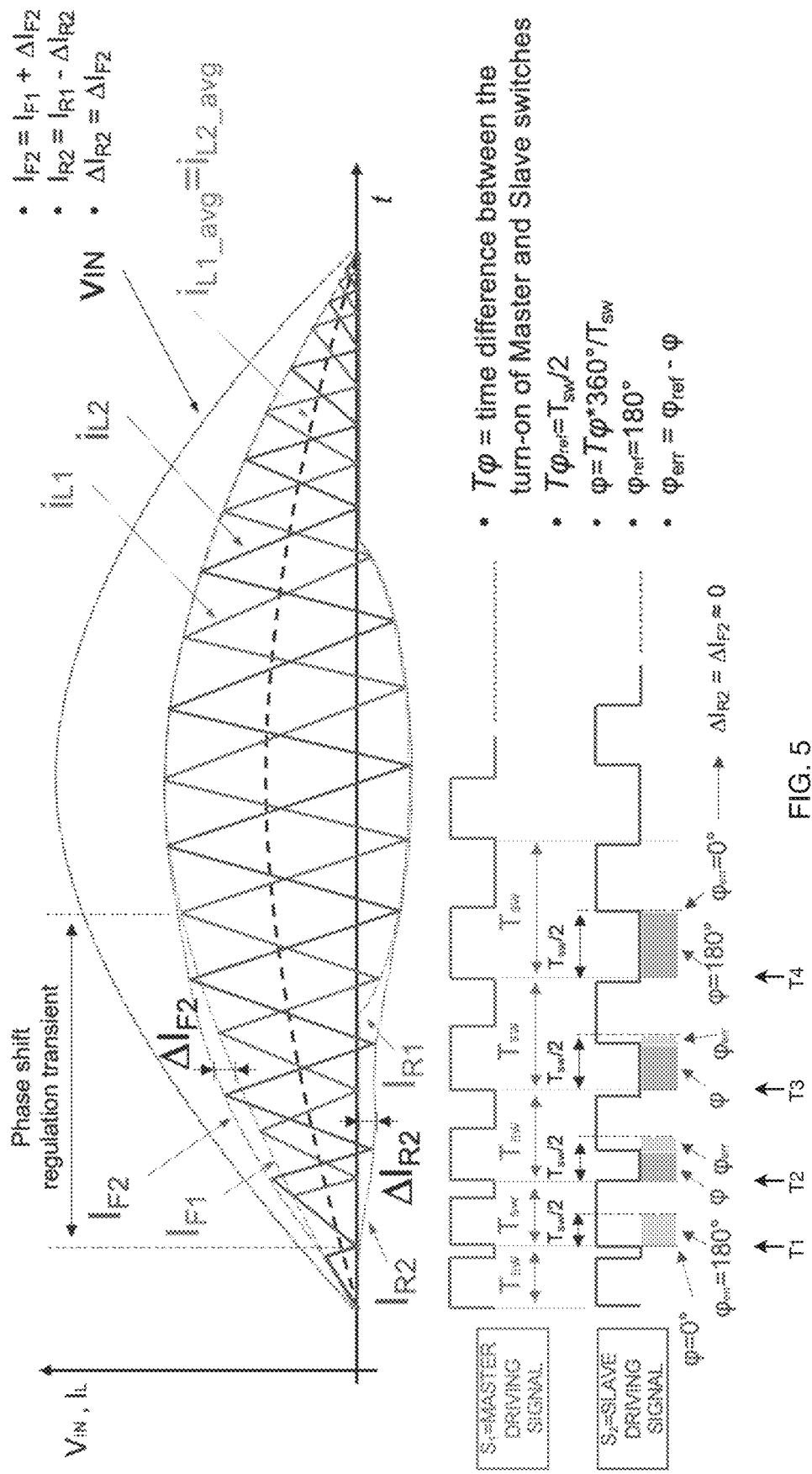
FIG. 5 is a graph showing the inductor currents of the interleaved totem-pole PFC circuit of FIG. 2 during operation in a zero voltage switching (ZVS) mode, in the case where the inductors are balanced.

Refer now to FIG. 5, showing additional results of the control scheme performed by the controller 20 on the high-frequency bridge 12. In this example, the two-channel interleaved PFC circuit 10 is operating in zero voltage switching (ZVS) with hysteresis current control, where the inductors L1, L2 are balanced (e.g., L1=L2). The upper current thresholds $I_{F1}$, $I_{F2}$ current thresholds are set to define sinusoidally shaped upper enveloped, while the lower current thresholds $I_{R1}$, $I_{R2}$ are set to achieve the ZVS.

As with the above examples, compensation is performed on the slave channel by adding a compensation value $\Delta I_{F2}$ to the upper threshold $I_{F2}$ and subtracting the quantity $\Delta I_{R2}$ from the lower threshold $I_{R2}$ (determination of the compensation values $\Delta I_{F2}$, $\Delta I_{R2}$ will be described in detail below, with it being understood that $\Delta I_{F2}=\Delta I_{R2}$). As with the above examples, the phase shift error $\varphi_{err}$ decreases during each cycle until it reaches 0, and the desired phase shift $\varphi=\varphi ref=180°$ is obtained, yielding a high power factor. As with the above examples, the inductor currents $I_{L1}$, $I_{L2}$ fully extend within their respective envelopes set by the upper current thresholds $I_{F1}$, $I_{F2}$ and lower current thresholds $I_{R1}$, $I_{R2}$, and the instantaneous average inductor currents $I_{L1\_avg}$ and $I_{L2\_avg}$ are equal due to the use of the compensation values of $\Delta I_{F2}=\Delta I_{R2}$. As the desired phase shift has been achieved, the phase shift error yen becomes zero, with the result being that the compensation values are set to and maintained at near zero for the balanced inductor example of FIG. 5, maintaining the desired phase shift.

Figure 6:
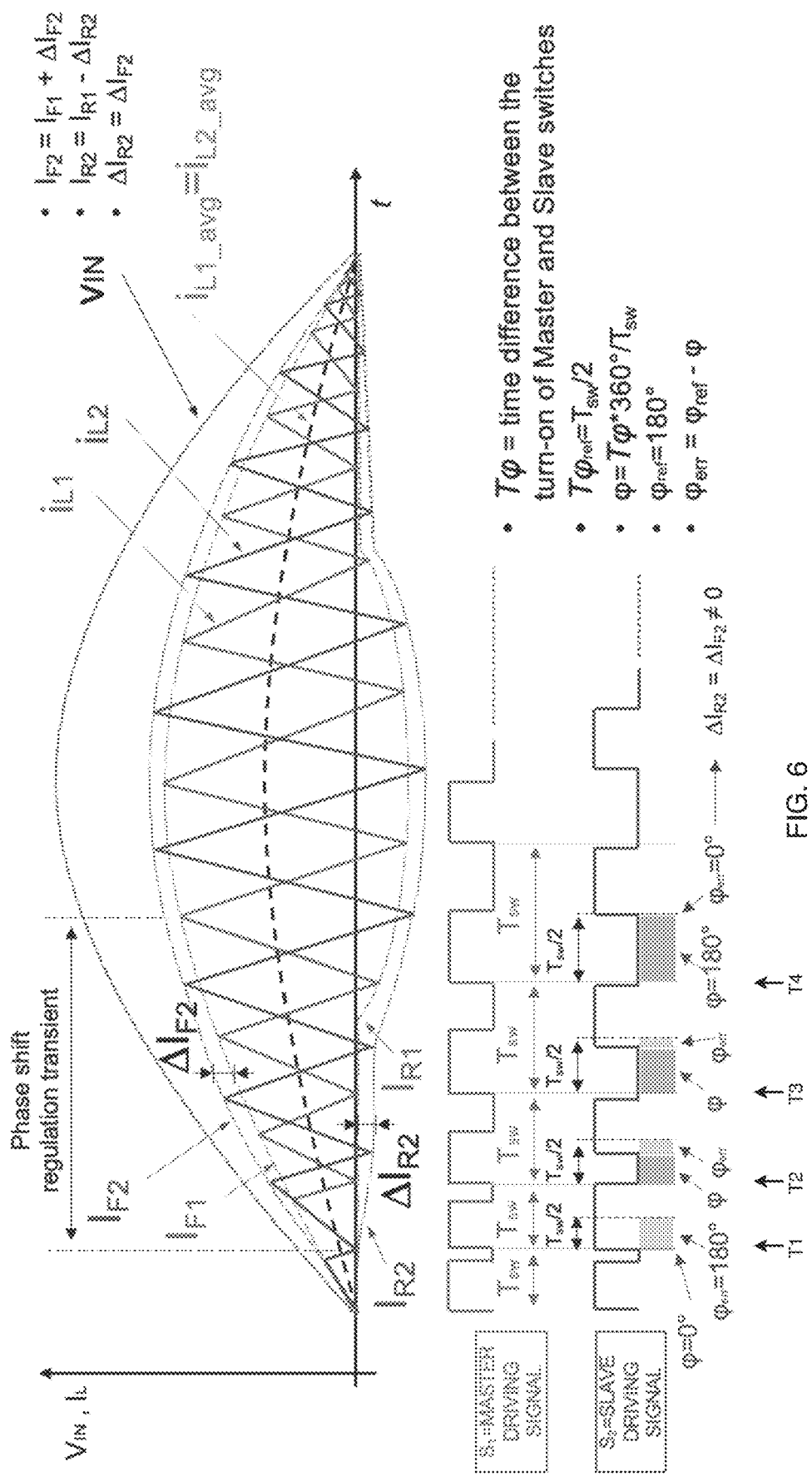
FIG. 6 is a graph showing the inductor currents of the interleaved totem-pole PFC circuit of FIG. 2 during operation in a second mode, in the case where the inductors are unbalanced.
Figure 7:
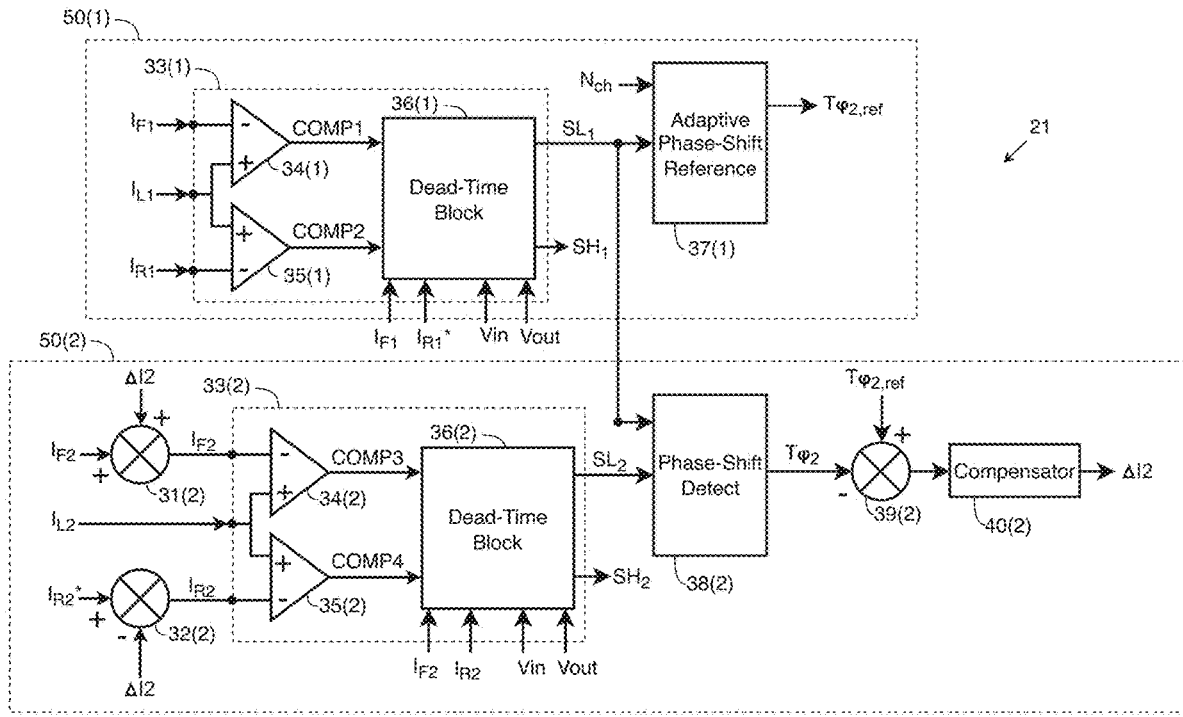
FIG. 7 is a schematic block diagram of the HF PWM control circuit of FIG. 2.

The compensation values are set to different non-zero values in the example of FIG. 6 in which the inductors L1, L2 are not balanced. Here, the inductor L2 may have a lower inductance than the inductor L1. Therefore, the inductor L2 is faster than L1 to reach the same threshold level (because the inductor current slope is given by Vin/L). If the threshold for L2 were set to the same as for L1, then L2 would end up with a high switching frequency, and phase shift control would be lost. Thus, the compensation values are appropriately set to maintain the desired phase shift.

Referring back to FIG. 3, specific circuit implementation details of the interleaved totem-pole PFC circuit 10 are now discussed.

The high-frequency bridge 12 includes: an n-channel transistor Q1 having its drain connected to a first output node No1, its source connected to node N1, and its gate connected to receive the drive signal $S_{H1}$; an n-channel transistor Q2 having its drain connected to node N1, its source connected to a second output node No2, and its gate connected to receive the drive signal $S_{L1}$; an n-channel transistor Q3 having its drain connected to the first output node No1, its source connected to node N2, and its gate connected to receive the drive signal $S_{H2}$; and an n-channel transistor Q4 having its drain connected to node N2, its source connected to the second output node No2, and its gate connected to receive the drive signal $S_{L2}$.

The low-frequency bridge 13 includes: a transistor SD1 having its drain connected to the first output node No1, its source connected to node N4, and its gate connected to receive the drive signal $S_{DH}$; and a transistor SD2 having its drain connected to node N4, its source connected to the second output node No2, and its gate connected to receive the drive signal SDL. The transistors SD1, SD2 may be standard silicon-based transistors, or may be WBG transistors, for example formed from SiC.

The controller 20 includes a PWM control circuit 25 for the low-frequency bridge 13 ("LF PWM Control") that receives the input voltage Vin from node Nn as input, and generates the drive signals $S_{DH}$, SDL for the low-frequency bridge 13 as output, with the drive signals $S_{DH}$, SDL having a switching frequency equal to the frequency of the input AC voltage VAC.

The controller 20 further includes a voltage control circuit 24 that receives the output voltage Vout at output node No1 together with an output voltage reference Vout ref as input, and generates the reference current Ipk_ref as output. The voltage control circuit 24 is used to perform a voltage control loop that continuously compares Vout and Vout ref, and error is regulated to zero via an internal compensator. The output Ipk_ref is set as a base upper threshold in order to deliver a suitable input current for maintaining the output voltage Vout at the reference level Vout ref regardless of load condition.

The controller 20 further includes a lower threshold control circuit 22 and an upper threshold control circuit 23. The lower threshold control circuit 22 receives the input voltage Vin from node Nn as well as the output voltage Vout from node No1 as input, and generates the uncompensated lower reference currents $I_{R1}$*, $I_{R2}$* as output. The upper threshold control circuit 23 receives the input voltage Vin from node Nn, the output current Tout, and the reference current Ipk_ref as input, and generates the uncompensated upper reference currents $I_{F1}$*, $I_{F2}$* as output. The input voltage Vin is used to implement an input voltage feed-forward, with the output current Tout being used to implement a load feed-forward. This allows the enhancement of the PFC response in the case of input voltage variation or load step in order to maintain Vout as being as constant as reasonably possible. In addition, the input voltage Vin and the output voltage Vout are used to set the dead-time between the drive signals $S_{H1}$, $S_{L1}$ and between the drive signals $S_{H2}$, $S_{L2}$.

The controller 20 includes a PWM control circuit 21 for the high-frequency bridge 12 ("HF PWM Control") that receives the input voltage Vin, the output voltage Vout, the inductor currents $I_{L1}$, L2, as well as the uncompensated lower reference currents $I_{R1}$*, $I_{R2}$* and the uncompensated upper reference currents $I_{F1}$*, $I_{F2}$* as input. The PWM control circuit 21 generates the drive signals $S_{H1}$, $S_{L1}$, $S_{H2}$, $S_{L2}$ for the high-frequency bridge 12 based upon its inputs.

With reference to FIGS. 7-10, specific details of the PWM control circuit 21 will be described, and thereafter, operation of the interleaved totem-pole PFC circuit 10 will be described in detail.

As explained above, in this specific example, the high-frequency bridge 12 includes two branches (e.g., channels), with the first channel being formed by transistors Q1, Q2 and the second channel being formed by transistors Q3, Q4. One branch of the high-frequency bridge 12 is to be considered a master branch and the other branches of the high-frequency bridge 12 are to be considered slave branches. Since there are two total branches in the high-frequency bridge 12 in this example, there is one slave branch, but it should be understood that if there are n total branches, there will be n−1 slave branches; therefore, in the example illustrated in FIG. 7, n=2.

The PWM control circuit 21 includes master control circuitry 50(1) and slave control circuitry 50(2). The master control circuitry 50(1) generates the drive signals $S_{H1}$, $S_{L1}$ for the first branch, and the slave control circuitry 50(2) generates the drive signals $S_{H2}$, $S_{L2}$ for the second branch.

The master control circuitry 50(1) includes a comparison circuit 33(1) and an adaptive phase-shift reference generation circuit 37(1). The comparison circuit 33(1) includes: a first comparator 34(1) having a non-inverting input terminal receiving the inductor current $I_{L1}$ and an inverting input terminal receiving the uncompensated upper reference current $I_{F1}$*, and generating a comparison output signal COMP1; and a second comparator 35(1) having a non-inverting input terminal receiving the inductor current $I_{L1}$ and an inverting input terminal receiving the uncompensated lower reference current $I_{R1}$*, and generating a comparison output signal COMP2.

A dead-time block 36(1) receives the input voltage Vin, the output voltage Vout, uncompensated upper reference current $I_{F1}$*, uncompensated lower reference current $I_{R1}$*, and comparison output signals COMP1, COMP2 and generates the drive signals $S_{H1}$, $S_{L1}$ therefrom. The dead-time block 36(1) serves to ensure that the switches Q1 and Q2 are not on at the same time, which would result in a short circuit. Moreover, the dead-times can be set to guarantee the ZVS turn-on of one between Q1 and Q2 or both of them, according to the PFC mode of operation (e.g., CCM, TM, ZVS, etc).

The adaptive phase-shift reference generation circuit 37(1) receives the drive signal SL1 as well as an indication Nch indicating how many total channels n are present, and generates therefrom a timing reference Tφ2, ref for use by the slave control circuitry 50(2). The timing reference Tφ2, ref may be a voltage (for example in the implementation of FIG. 9) but may also be a timing value or a value in degrees, depending upon the specific implementation.

The slave control circuitry 50(2) includes an upper-threshold compensation circuit 31(2) that adds a compensation current ΔI2 to the uncompensated upper reference current $I_{F2}$* to produce the compensated upper reference current $I_{F2}$, and a lower-threshold compensation circuit 32(2) that subtracts the compensation current ΔI2 from the uncompensated lower reference current $I_{R2}$* to produce the compensated lower reference current $I_{R2}$. The slave control circuitry 50(2) further includes a comparison circuit 33(2) and a phase-shift detection circuit 38(2). The comparison circuit 33(2) includes: a first comparator 34(2) having a non-inverting input terminal receiving the inductor current $I_{L2}$ and an inverting input terminal receiving the compensated upper reference current $I_{F2}$, and generating a comparison output signal COMP3; and a second comparator 35(2) having a non-inverting input terminal receiving the inductor current $I_{L2}$ and an inverting input terminal receiving the compensated lower reference current $I_{R2}$, and generating a comparison output signal COMP4.

A dead-time circuit 36(2) receives the comparison output signals COMP3, COMP4, the input voltage Vin, the output voltage Vout, the compensated upper reference current $I_{F2}$, and the compensated lower reference current $I_{R2}$, and generates the drive signals $S_{H2}$, $S_{L2}$ therefrom. The dead-time block 36(2) serves to ensure that the switches Q3 and Q4 are not on at the same time, which would result in a short circuit. Moreover, the dead-times can be set to guarantee the ZVS turn-on of one between Q3 and Q4 or both of them, accordingly to the PFC operation mode (CCM, TM, ZVS, etc.).

The phase-shift detection circuit 38(2) receives the drive signals $S_{L1}$, $S_{L2}$ in this example (but could alternatively receive the driving signals $S_{H1}$, $S_{H2}$) and generates a timing comparison Tφ2 that is representative of the phase shift (in seconds) between those drive signals. A pre-compensation circuit 39(2) subtracts the timing comparison Tφ2 from the timing reference Tφ2, ref and a compensator circuit 40(2) produces the compensation current ΔI2—the timing comparison Tφ2 and timing reference Tφ2, ref may be, degrees or voltages indicative of the times they represent.

In the above example, the adaptive phase-shift reference generation circuit 37(1) receives the low-side drive signal $S_{L1}$ as input and from it generates the timing reference Tφ2, ref, but the adaptive phase-shift reference generation circuit 37(1) may instead receive the high-side drive signal $S_{H1}$ as input and from it generate the timing reference Tφ2, ref. In this instance, the phase-shift detection circuit 38(2) would receive the high-side drive signal $S_{H2}$ from the dead-time circuit 36(2) and generate the timing comparison Tφ2 as being representative of the phase shift (in seconds) between the drive signals $S_{H1}$, $S_{H2}$.

Figure 8:
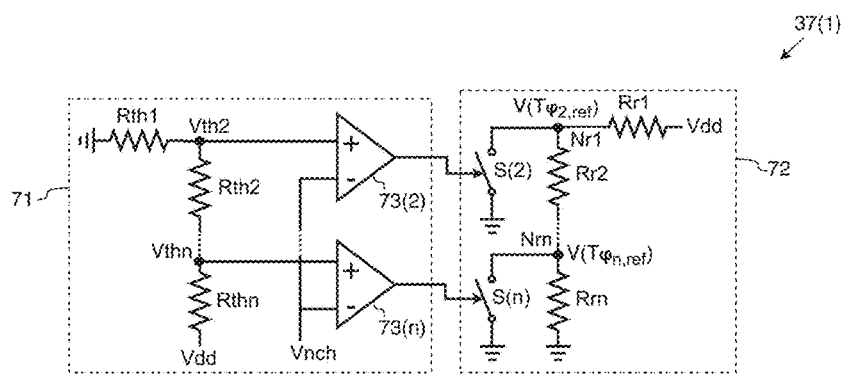
FIG. 8 is a schematic diagram of the adaptive phase-shift reference generation circuit of FIG. 7.

A sample physical analog implementation of the adaptive phase-shift reference generation circuit 37(1) is now described in greater detail with reference to FIG. 8. The adaptive phase-shift reference generation circuit 37(1) includes a channel selection circuit 71 that dynamically generates control signals for a reference generation circuit 72 that dynamically causes the generation of the timing reference voltages as having the proper value for the number of channels actually enabled. Although the adaptive phase-shift reference generation circuit 37(1) generates one timing reference voltage per active slave channel and in the above example there is one slave channel, the circuit for the adaptive phase-shift reference generation circuit 37(1) is illustrated as being capable of generating threshold values for multiple active slave channels (if they were present) to aid understanding by the reader.

The channel selection circuit 71 includes n−1 comparators, illustratively comparators 73(2), . . . , 73(n), and n resistors. In particular, resistor Rth1 is connected between ground and a non-inverting input terminal of the comparator 73(2), resistor Rth2 is connected between the non-inverting input terminal of the comparator 73(2) and the non-inverting input terminal of the comparator 73(n), and the nth resistor Rthn is connected between the non-inverting input terminal of the comparator 73(n) and the supply voltage Vdd. The inverting input terminals of the n−1 comparators 73(2), . . . , 73(n) are connected to a voltage Vnch indicative of the actual number of enabled slave channels. The resistors Rth1, Rthn may be equal in resistance, or may be unequal in resistance. A voltage Vth is formed at the non-inverting input terminal of the comparator 73(2) and a voltage Vthn is formed at the non-inverting input terminal of the comparator 73(n).

The reference generation circuit 72 includes n−1 switches, illustratively switches S(2), . . . , S(n) and n resistors. In particular, resistor Rr1 is connected between the supply voltage Vdd and a node Nr1 at which the timing reference voltage V(Tφ2, ref) is generated, resistor Rr2 is connected between the node Nr1 and a node Nm at which the timing reference voltage V(Tφn, ref) is generated, and the nth resistor Rrn is connected between node Nm and ground. A switch S(2) is connected between node Nr1 and ground, and is controlled by the output of the comparator 73(2), and a switch S(n) is connected between the node Nm and ground, and is controlled by the output of the comparator 73(n).

The value of Vth2 can be calculated as:

$$Vth2 = \frac{Rth1}{\sum_{n=1}^{n=Ntot} Rthn} \cdot Vdd$$

The value of Vthn can accordingly be calculated as:

$$Vthn = \frac{\sum_{n=1}^{n=Ntot-1} Rthn}{\sum_{n=1}^{n=Ntot} Rthn} \cdot Vdd$$

Below is a table of values of the timing reference voltages for different possible values of n, with the adaptive phase-shift reference generation circuit 37(1) being modified accordingly.

| Timing Reference Generation Table | | | | | |
|---|---|---|---|---|---|
| Nch | Vnch | V(Tφ2, ref) | V(Tφ3, ref) | V(Tφ4, ref) | V(Tφn, ref) |
| 1 | <Vth2 | Disabled | Disabled | Disabled | Disabled |
| 2 | >Vth2 | $\frac{1}{2}Vdd$ | Disabled | Disabled | Disabled |
| 3 | >Vth3 | $\frac{2}{3}Vdd$ | $\frac{1}{3}Vdd$ | Disabled | Disabled |

Timing Reference Generation Table

| Nch | Vnch | V(Tφ2, ref) | V(Tφ3, ref) | V(Tφ4, ref) | V(Tφn, ref) |
|---|---|---|---|---|---|
| 4 | >Vth4 | $\frac{3}{4}Vdd$ | $\frac{2}{4}Vdd$ | $\frac{1}{4}Vdd$ | Disabled |
| ... | | | | | |
| Ntot | >Vthn | $\frac{Nch-1}{Nch} \cdot Vdd$ | $\frac{Nch-2}{Nch} \cdot Vdd$ | $\frac{Nch-3}{Nch} \cdot Vdd$ | $\frac{Nch-(n-1)}{Nch} \cdot Vdd$ |

Figure 19:
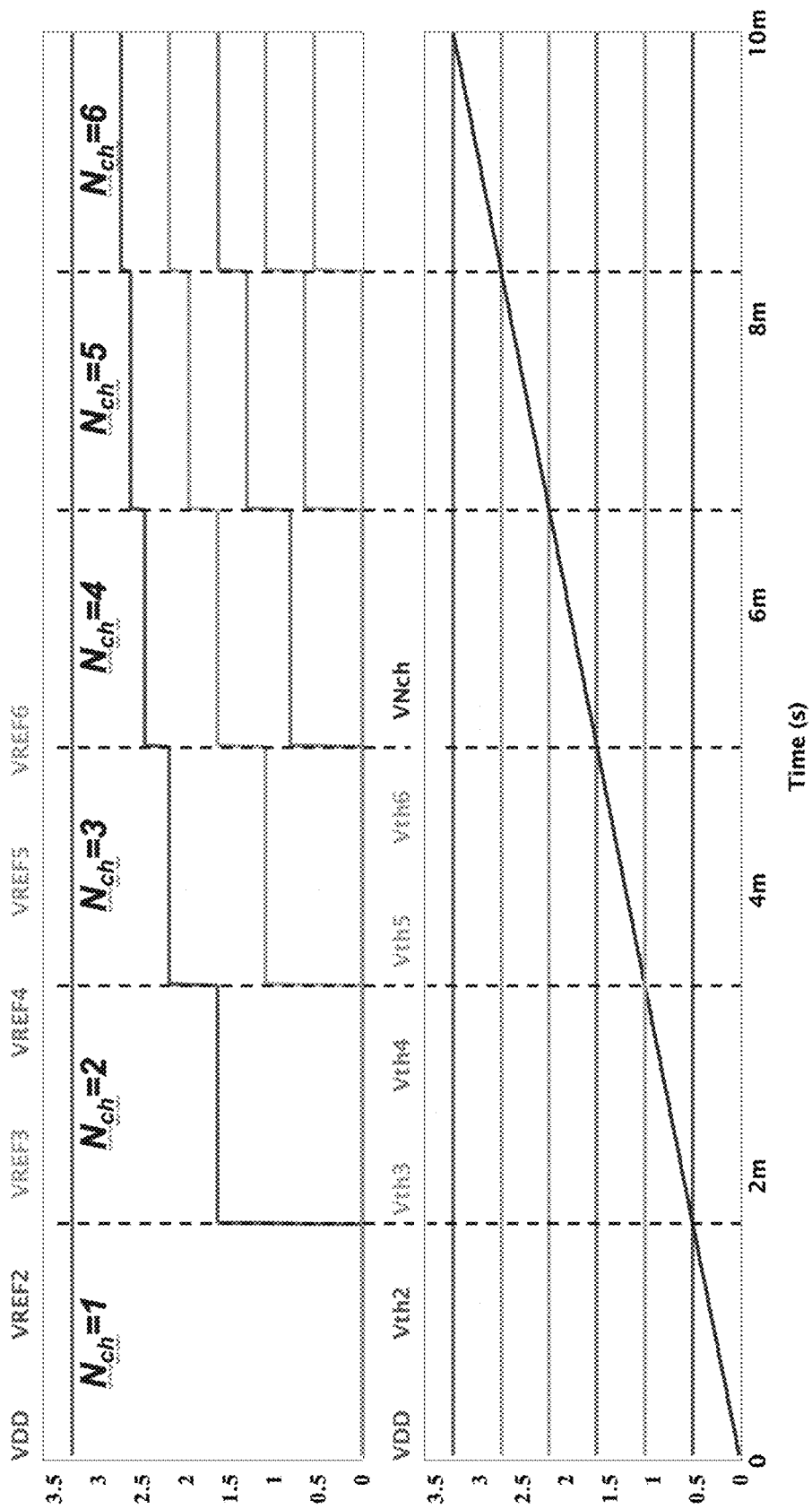
FIG. 19 is a graph showing simulation results of the adaptive phase-shift reference generation circuit of FIG. 8 in operation.

Simulation results showing the adaptive phase-shift reference generation circuit 37(1) in operation are contained in FIG. 19. In particular, an example with six interleaved channels, e.g. Ntot=6, is shown. The phase-shift reference for each channel is dynamically adapted based on the actual number of enabled channel Nch, in order to obtain the proper interleaving for each value of Nch, minimizing the total inductor current ripple.

An advantage of this circuit compared to the prior art is that when Nch is changed, the step of each generated phase-shift reference, VREFn level, is minimized, helping to reduce transient perturbations during enabling/disabling the interleaved channels.

A sample physical analog implementation of the slave control circuitry 50(2) is now described in greater detail with reference to FIG. 9. Assuming n channels are present in the high-frequency bridge 12, there will be n−1 separate instances of the slave control circuitry. Since there are two channels in the example described above, one instance of the slave control circuitry 50(2) is illustrated. The phase-shift detection circuit 38(2) within the slave control circuitry 50(2) includes an SR flip-flop 51(2) which receives the driving signal $S_{L1}$ (e.g., the driving signal of the master channel) at its "set" input terminal and the driving signal $S_{L2}$ (e.g., the driving signal of the slave channel to which the slave control circuitry 50(2) belongs) at its "reset" input terminal. A resistor R1 is connected between the output of the SR flip-flop 51(2) and a node Ns1, and a resistor R2 is connected between node Ns1 and a non-inverting input terminal of an amplifier 52(2). A capacitor C2 is connected between the non-inverting input terminal of the amplifier 52(2) and ground, and a capacitor C1 is connected between node Ns1 and an output terminal of the amplifier 52(2). The inverting input terminal of the amplifier 52(2) is connected to the output terminal of the amplifier 52(2) in a unity gain configuration. The timing comparison voltage V(Tφ2) is produced at the output of the amplifier 52(2). Note that the configuration of the amplifier 52(2) may be modified to provide a non-unity gain if so desired.

The pre-compensation circuit 39(2) includes a resistor R3 connected between the output of the amplifier 52(2) and an inverting input terminal of an amplifier 53(2) and a resistor R4 connected between the inverting input terminal of the amplifier 53(2) and the output of the amplifier 53(2). A resistor R5 is connected between the timing reference voltage V(Tφ2, ref) and a non-inverting input terminal of the amplifier 53(2), and a resistor R6 is connected between the non-inverting input terminal of the amplifier 53(2) and an offset voltage Voffset.

The compensator circuit 40(2) includes a resistor R7 connected between the output terminal of the amplifier 53(2) and an inverting input terminal of an amplifier 54(2) and a resistor R8 connected between the inverting input terminal of the amplifier 54(2) and an output terminal of the amplifier 54(2). A non-inverting input terminal of the amplifier 54(2) is connected to the offset voltage Voffset. The compensator circuit 40(2) also includes a resistor R10 connected between the output of the amplifier 53(2) and an inverting input terminal of an amplifier 55(2) and a capacitor C3 connected between the inverting input terminal of the amplifier 55(2) and an output of the amplifier 55(2). The non-inverting input terminal of the amplifier 55(2) is connected to the offset voltage Voffset. A resistor R9 is connected between the output terminal of the amplifier 54(2) and an inverting input terminal of an amplifier 56(2), and a resistor R11 is connected between the output terminal of the amplifier 55(2) and the inverting input terminal of the amplifier 56(2). A resistor R12 is connected between the inverting input terminal of the amplifier 56(2) and the output terminal of the amplifier 56(2) and a non-inverting input terminal of the amplifier 56(2) is connected to the offset voltage Voffset. A non-inverting input terminal of an amplifier 57(2) is connected to the output terminal of the amplifier 56(2), and the inverting input terminal of the amplifier 57(2) is connected to the output terminal of the amplifier 57(2). The compensation current ΔI2 is produced at the output of the amplifier 57(2).

The upper-threshold compensation circuit 31(2) includes a resistor R13 connected between the voltage $V(I_{F2}^*)$ representative of the uncompensated upper reference current $I_{F2}^*$ and a non-inverting input terminal of an amplifier 58(2), and a resistor R14 connected between the voltage V(ΔI2) representative of the compensation current ΔI2 and the non-inverting input terminal of the amplifier 58(2). A resistor R15 is connected between the offset voltage Voffset and an inverting input terminal of the amplifier 58(2) and a resistor R16 is connected between the inverting input terminal of the amplifier 58(2) and an output terminal of the amplifier 58(2). The voltage $V(I_{F2})$ representative of the compensated upper reference current $I_{F2}$ is produced at the output terminal of the amplifier 58(2).

The lower-threshold compensation circuit 32(2) includes a resistor R19 connected between the voltage $V(I_{R2}^*)$ representative of the uncompensated lower reference current $I_{R2}^*$ and a non-inverting input terminal of an amplifier 59(2), and a resistor R20 connected between the offset voltage Voffset and the non-inverting input terminal of the amplifier 59(2). A resistor R17 is connected between the offset voltage Voffset and an inverting input terminal of the amplifier 59(2), a resistor R18 is connected between the voltage V(ΔI2) representative of the compensation current ΔI2 and the inverting input terminal of the amplifier 59(2), and a resistor R21 is connected between the inverting input terminal of the amplifier 59(2) and an output terminal of the amplifier 59(2). The voltage $V(I_{R2})$ representative of the compensated lower reference current $I_{R2}$ is produced at the output terminal of the amplifier 59(2).

Figure 10:
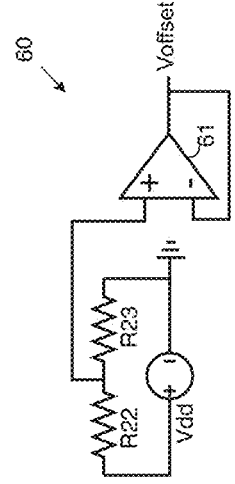
FIG. 10 is a schematic diagram of an offset voltage generation circuit that generates the offset voltage used by the slave control circuitry of FIG. 9.

An offset generation circuit 60 is shown in FIG. 10 and serves to generate the offset voltage Voffset. The offset generation circuit 60 includes resistors R22, R23 connected in series between the supply voltage Vdd and ground, with a non-inverting input terminal of an amplifier 61 being connected to the tap between resistors R22, R23. An inverting input terminal of the amplifier 61 is connected to an output of the amplifier 61 in a unity gain configuration. Note that the configuration of the amplifier 61 may be modified to provide a non-unity gain if so desired.

Operation of the interleaved totem-pole PFC circuit 10 is now described. Refer back to FIG. 8. Since in this example there are two channels in the high-frequency bridge 12, assume that the slave channel will be activated by Vnch being set such that the voltage at the tap between Rth1 and Rth2 is lower than Vnch, with the result being that the output of the comparator 73(2) is deasserted to open switch S(2), setting the timing reference voltage V(Tφ2, ref) to be equal to $$\frac{Rr2}{Rr2 + Rr1} \cdot Vdd.$$

This is a voltage representative of a desired phase difference φ between the driving signals for the two channels being 180°.

Refer back to FIG. 2. The voltages $V(I_{F1}*)$, $V(I_{F2}*)$ representative of the uncompensated upper reference currents $I_{F1}*$, $I_{F2}*$ are set by the upper threshold control circuit 23 based upon the input voltage Vin and the output current Iout, and the voltages $V(I_{R1}*)$, $V(I_{R2}*)$ representative of the uncompensated lower reference currents $I_{R1}*$, $I_{R2}*$ are set by the lower threshold control circuit 22 based upon the input voltage Vin and the output voltage Vout.

Referring back now to FIG. 6, initially, the inductor currents $I_{L1}$, $I_{L2}$ will be at zero. As a result, $V(I_{L1})$ will be less than $V(I_{F1}*)$ causing the comparator 34(1) to deassert its output COMP1, and IL1 will be equal to $V(I_{R1}*)$ causing the comparator 35(1) to assert its output COMP2. Based upon COMP2 being asserted and COMP1 being deasserted, the pulse widths of $S_{L1}$ and $S_{L2}$ are increased.

At time T1, the high-side driving signals to the master channel $S_{H1}$ and to the slave channel $S_{H2}$ are equal in frequency and aligned in phase, and the low-side driving signals to the master channel $S_{L1}$ and to the slave channel $S_{L2}$ are equal in frequency and aligned in phase (and complementary to the driving signals $S_{H1}$, $S_{H2}$)—assume for this example that $S_1$ is $S_{L1}$ and $S_2$ is $S_{L2}$. Therefore, at time T1 the phase difference φ between $S_1$ and $S_2$ is 0°, and the phase error $φ_{err}$ between $S_1$ and $S_2$ is 180°.

Figure 9:
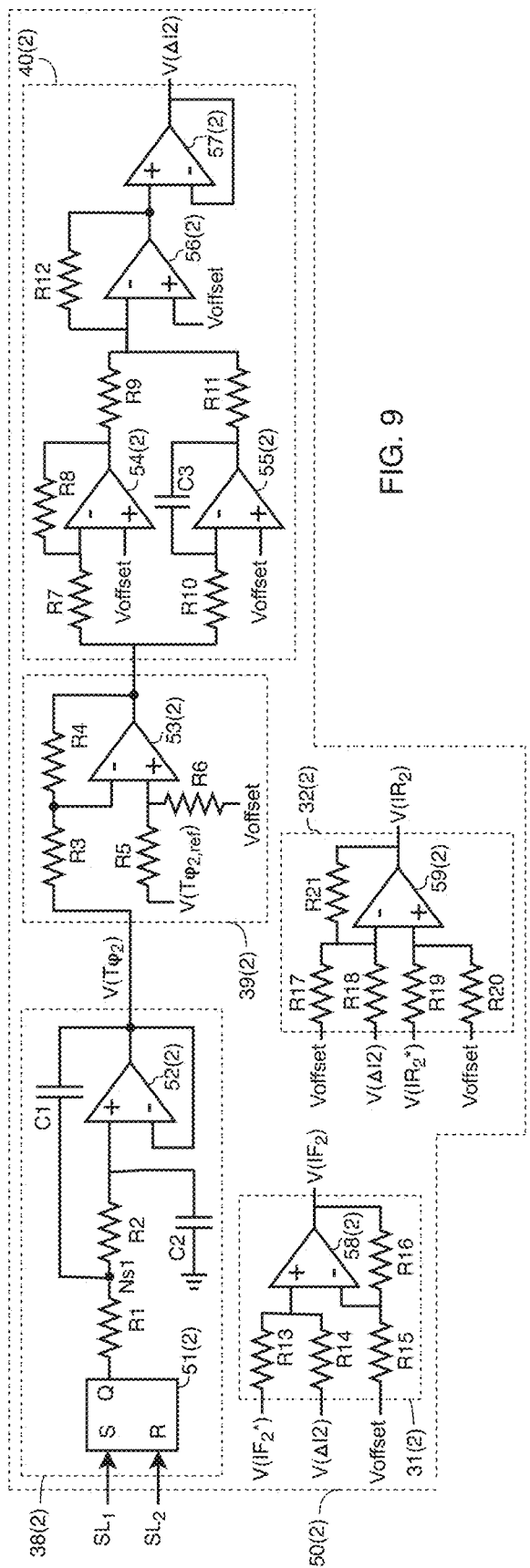
FIG. 9 is a schematic diagram of the slave control circuitry of FIG. 7.

Refer additionally to FIG. 9. The output of the SR flip flop 51(2) will be high for a period of time proportional to the phase difference φ between $S_{L1}$ and $S_{L2}$. The arrangement of the amplifier 52(2) acts as a second order filter; since there is no phase difference φ between $S_{L1}$ and $S_{L2}$ at this point, the output voltage V(Tφ2) of the amplifier 52(2) will be zero, which corresponds to the lack of phase difference φ between $S_{L1}$ and $S_{L2}$. The arrangement of the amplifier 53(2) acts as a differential amplifier, and therefore the output thereof is a function of the difference between V(Tφ2) and the timing reference voltage V(Tφ2, ref), which in this case is V(Tφ2, ref). The arrangement of the amplifier 54(2) acts proportionally on this difference, while the arrangement of the amplifier 55(2) integrates this difference, with the result being further proportionally acted upon by the arrangement of the amplifier 56(2) and then buffered by the arrangement of the amplifier 57(2) to yield the voltage V(ΔI2) representative of the compensation current ΔI2. The arrangement of the amplifier 58(2) then serves to add the voltage V(ΔI2) representative of the compensation current ΔI2 to the voltage $V(I_{F2}*)$ representative of the uncompensated upper reference current $I_{F2}*$ to yield the voltage $V(I_{F2})$ representative of the compensated upper reference current $I_{F2}$. Similarly, the arrangement of the amplifier 59(2) serves to subtract the voltage V(ΔI2) representative of the compensation current ΔI2 from the voltage $V(I_{R2}*)$ representative of the uncompensated lower reference current $I_{R2}*$ to yield the voltage $V(I_{R2})$ representative of the compensated lower reference current $I_{R2}$.

Due to the analog arrangement that ultimately generates and updates the voltage $V(I_{F2})$ representative of the compensated upper reference current $I_{F2}$ and voltage $V(I_{R2})$ representative of the compensated lower reference current $I_{R2}$ based upon a phase comparison between the drive signal $S_1$ ($S_{L1}$ in this example) of the master and the drive signal $S_2$ ($S_{L2}$ in this example), the phase error $φ_{err}$ is reduced over time until it reaches zero. For example, the phase error $φ_{err}$ at time T2 is less than it was at time T1, and the phase error $φ_{err}$ at time T3 is less than it was at time T2, with the result being that by time T4, the phase error $φ_{err}$ had reached zero, with the result being that the phase difference φ between $S_1$ and $S_2$ is 180°, achieving high power factor. Observe that at this point, T4, the inductor current $I_{L1}$ fully expands between the envelope defined by the uncompensated upper reference current $I_{F1}$ and the uncompensated lower reference current $I_{R1}$ and the inductor current $I_{L2}$ fully expands between the envelope defined by the compensated upper reference current $I_{F2}$ and the compensated lower reference current $I_{R2}$.

Figure 11:
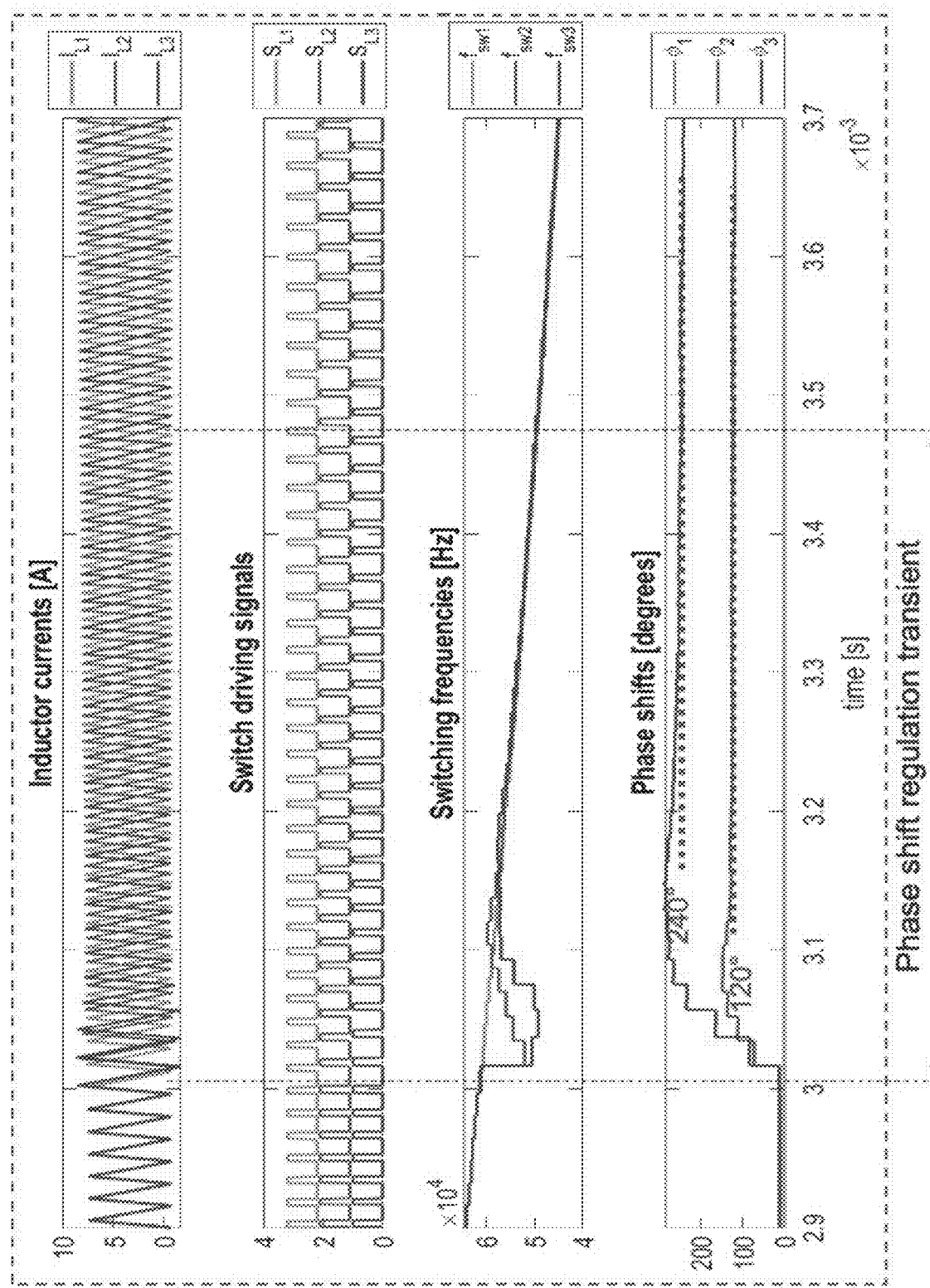
FIG. 11 is a graph showing the inductor currents, switch driving signals, switching frequencies, and phase shifts of the different channels of the interleaved totem-pole PFC circuit of FIG. 2 in the ZVS operation mode when the inductors are balanced.

An operating example for the case where the high-frequency bridge 12 includes three branches is shown in the graphs of FIG. 11. In this example, the inductors L1, L2, L3 are balanced (e.g., L1=L2=L3). The phase shift between branches is equal to 360°/n, and therefore in this example the desired phase shift between the drive signals $S_{L1}$ and $S_{L2}$ is 120° while the desired phase shift between the drive signals $S_{L2}$ and $S_{L3}$ is 240°. Referring now to the graph of FIG. 11, notice that from the beginning (time=0 ms) until 3 ms, there is no phase shift between the drive signals $S_{L1}$, $S_{L2}$, $S_{L3}$. At time=3 ms, the controller 20 is activated, and the continuous generation and updating of the compensation current and the addition/subtraction thereof to/from the uncompensated reference currents begins. As such, it can be observed that by approximately 3.05 ms, the drive signal $S_{L2}$ has achieved the desired phase shift of 120° with respect to the drive signal $S_{L1}$, and by approximately 3.1 ms, the drive signal $S_{L3}$ has achieved the desired phase shift of 240° with respect to the drive signal $S_{L1}$, resulting in high power factor. At this point, the inductor currents $I_{L1}$, $I_{L2}$, $I_{L3}$ each extend within their respective envelopes defined by their respective upper and lower thresholds $I_{F1}$, $I_{R1}$ $I_{F2}$, $I_{R2}$ and $I_{F3}$, $I_{R3}$. The settling time once the desired phase shifts are achieved is approximately 500 μs.

Figure 12:
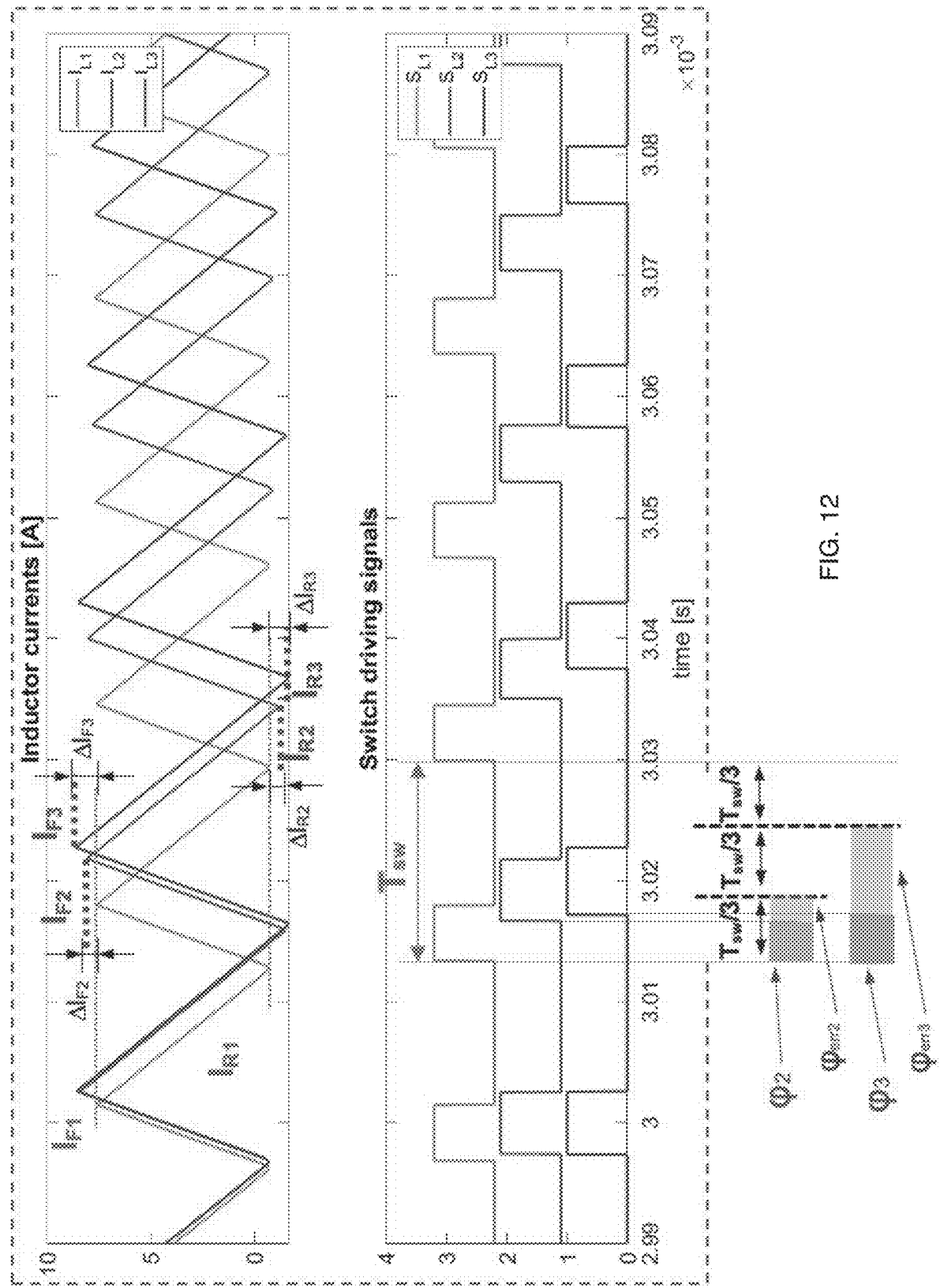
FIG. 12 is a greatly enlarged view of the graph of FIG. 11 during a first period of time.
Figure 13:
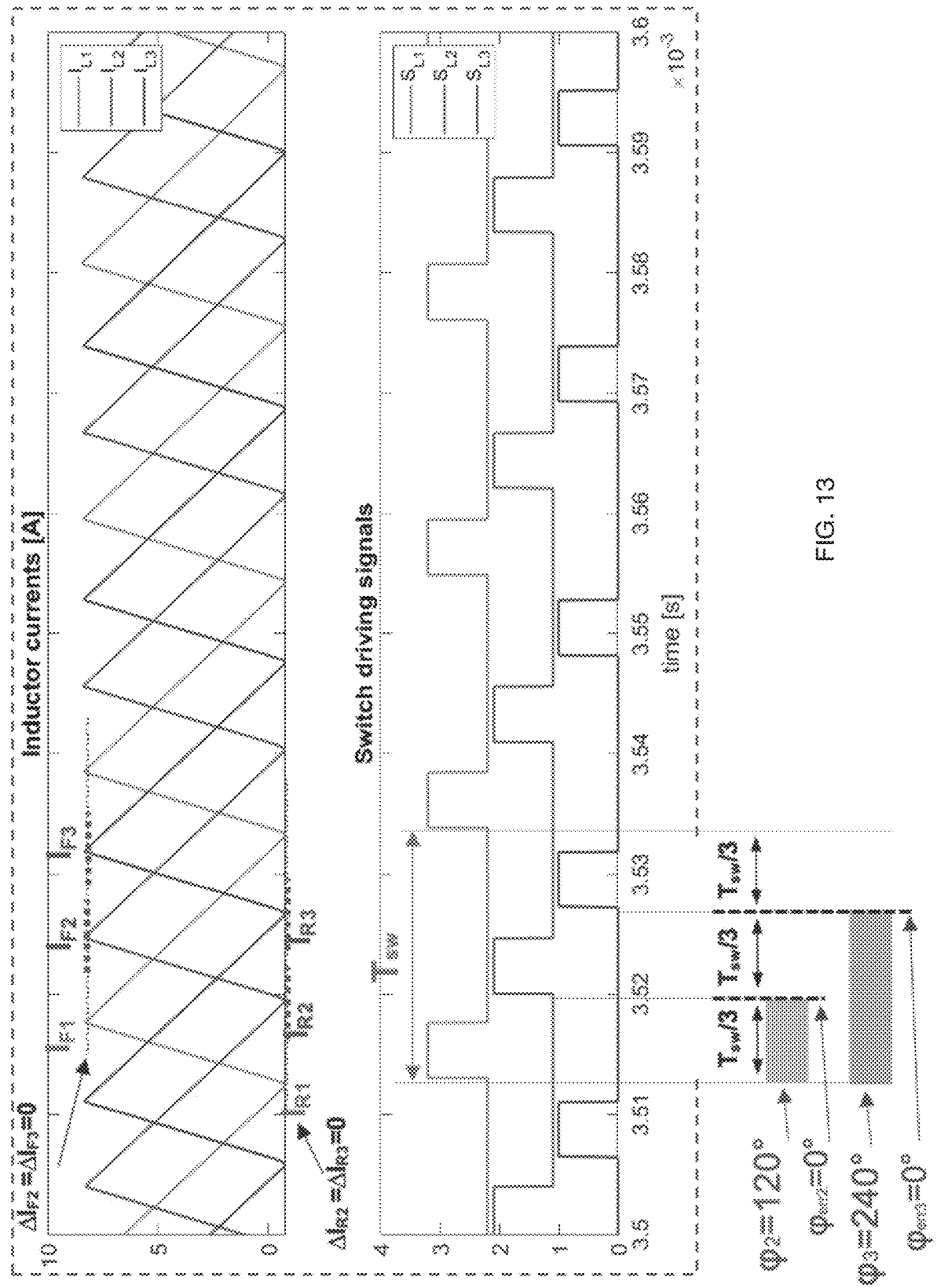
FIG. 13 is a greatly enlarged view of the graph of FIG. 11 during a second period of time.

A greatly enlarged view of the graph of FIG. 11 beginning just prior to 3 ms at which time the controller 20 is activated may be observed in FIG. 12. The phase shifting of the drive signals $S_{L1}$, $S_{L2}$, $S_{L3}$ over time can be observed, beginning where there is little to no phase difference between the drive signals $S_{L1}$, $S_{L2}$, $S_{L3}$, and ultimately arriving at the state where the desired phase shifts have been accomplished. A greatly enlarged view of the graph of FIG. 11 beginning at time=3.5 ms can be observed in FIG. 13, in which the compensation factors are near zero after the settling time, so ΔI2=ΔI3=0 because the inductors L1, L2, L3 are balanced.

Figure 14:
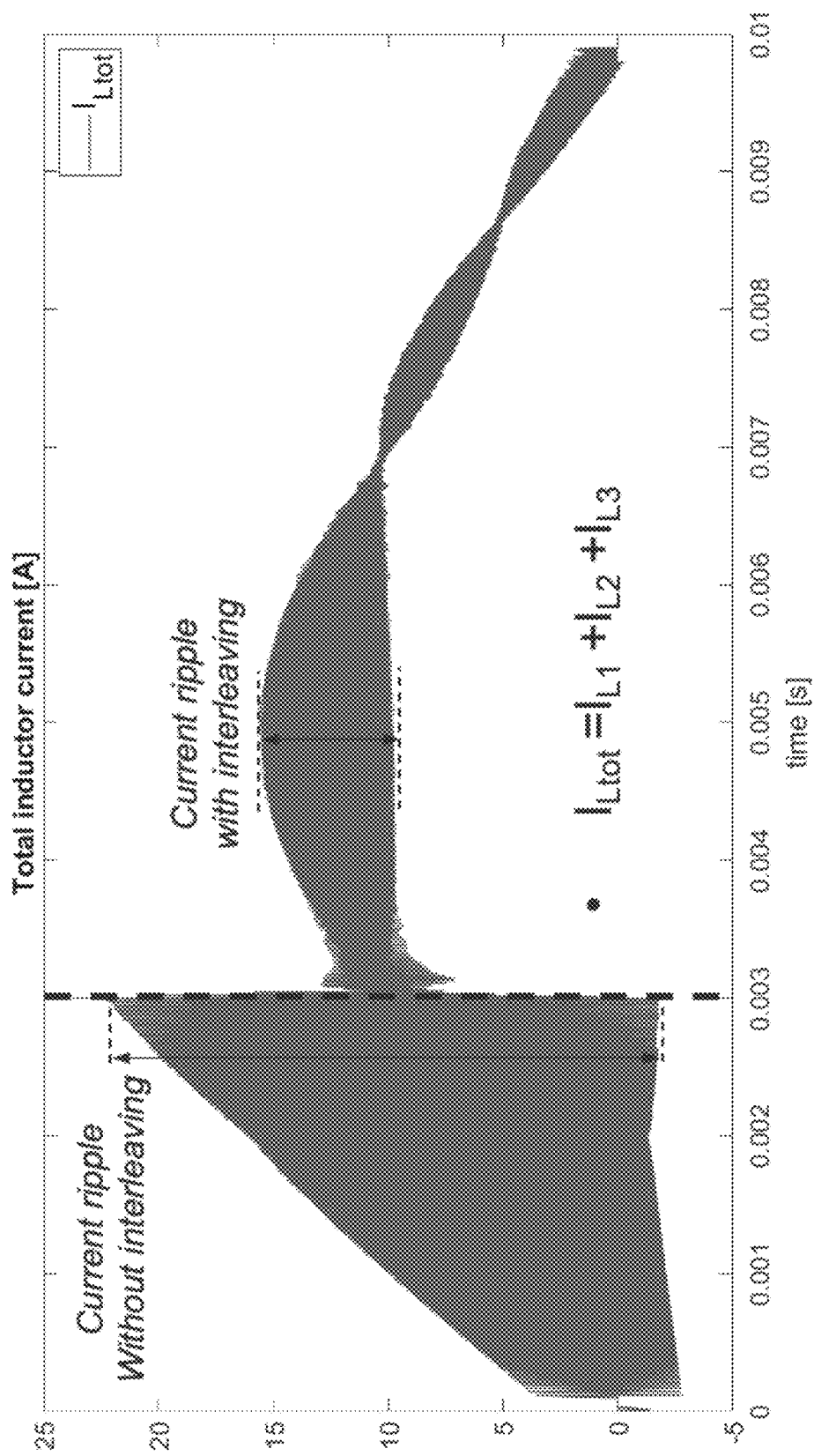
FIG. 14 is a graph showing total inductor current of the interleaved totem-pole PFC circuit of FIG. 2 in the ZVS operation mode when the inductors are balanced.

The total inductor current is shown in FIG. 14, wherein the decrease of current ripple due to beginning of the interleaving by activation of the controller 20 at time=3 ms can be seen.

Figure 15:
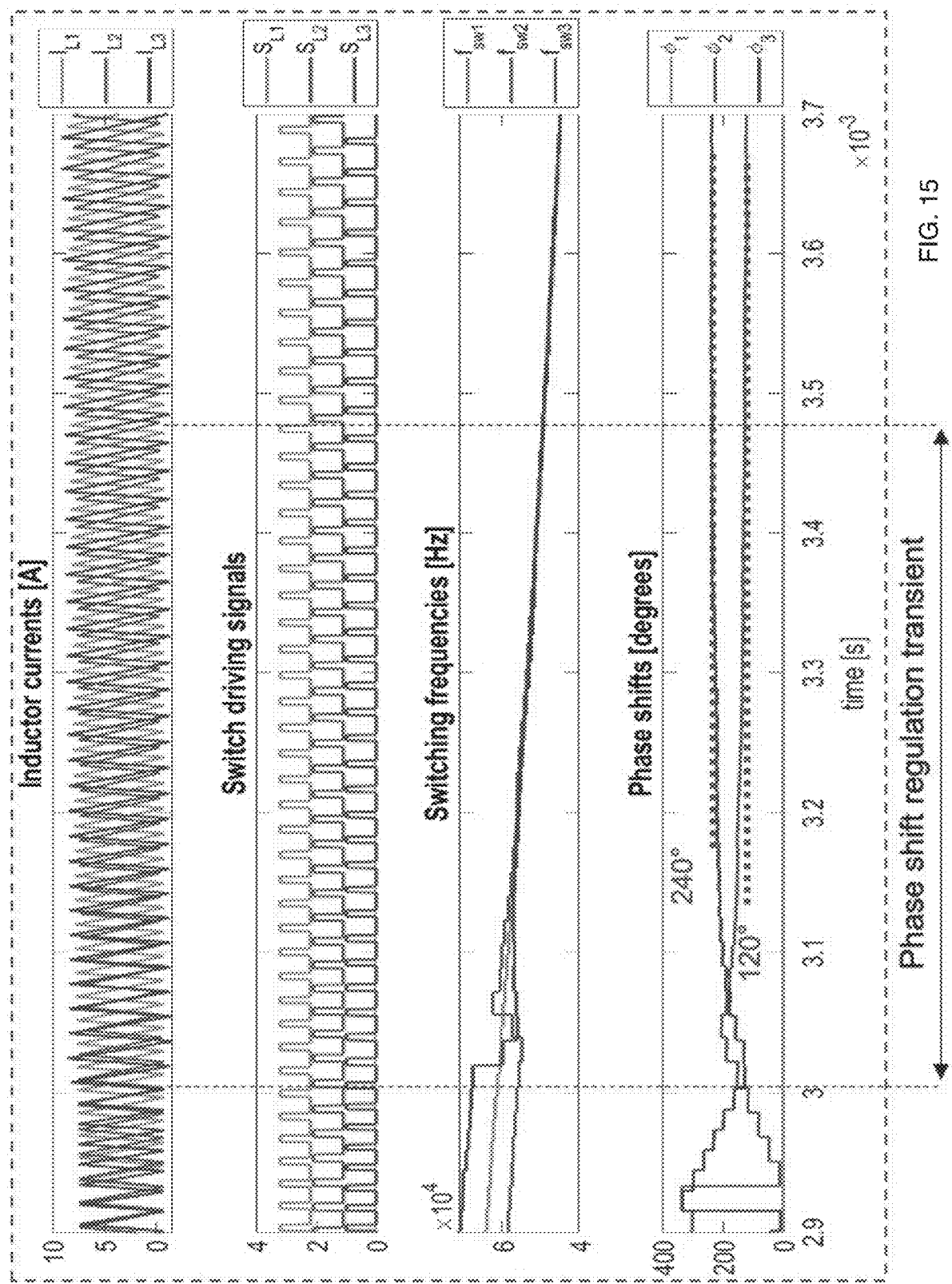
FIG. 15 is a graph showing the inductor currents, switch driving signals, switching frequencies, and phase shifts of the different channels of the interleaved totem-pole PFC circuit of FIG. 2 in operation when the inductors are unbalanced.

An operating example for the case where the high-frequency bridge 12 includes three branches, with the inductors L1, L2, L3 being unbalanced (L2>L1 and L3<L1), is shown in the graphs of FIG. 15. Referring now to the graph of FIG. 15, notice that from the beginning (time=0 ms) until time=3 ms, the phase shift between the drive signals $S_{L1}$, $S_{L2}$, $S_{L3}$ is not as desired, and the drive signals $S_{L1}$, $S_{L2}$, $S_{L3}$ do not switch at the same frequencies. At time=3 ms, the controller 20 is activated, and the continuous generation and updating of the compensation current and the addition/subtraction thereof to/from the uncompensated reference currents begins. By approximately 3.05 ms, the drive signal $S_{L2}$ has achieved the desired phase shift of 120° with respect to the drive signal $S_{L1}$, and by approximately 3.1 ms, the drive signal $S_{L3}$ has achieved the desired phase shift of 240° with respect to the drive signal $S_{L1}$, resulting in high power factor. At this point, the inductor currents $I_{L1}$, $I_{L2}$, $I_{L3}$ each extend within their respective envelopes defined by their respective upper and lower thresholds $I_{F1}$, $I_{R1}$, $I_{F2}$, $I_{R2}$ and $I_{F3}$, $I_{R3}$. The settling time once the desired phase shifts are achieved is approximately 500 µs.

Figure 16:
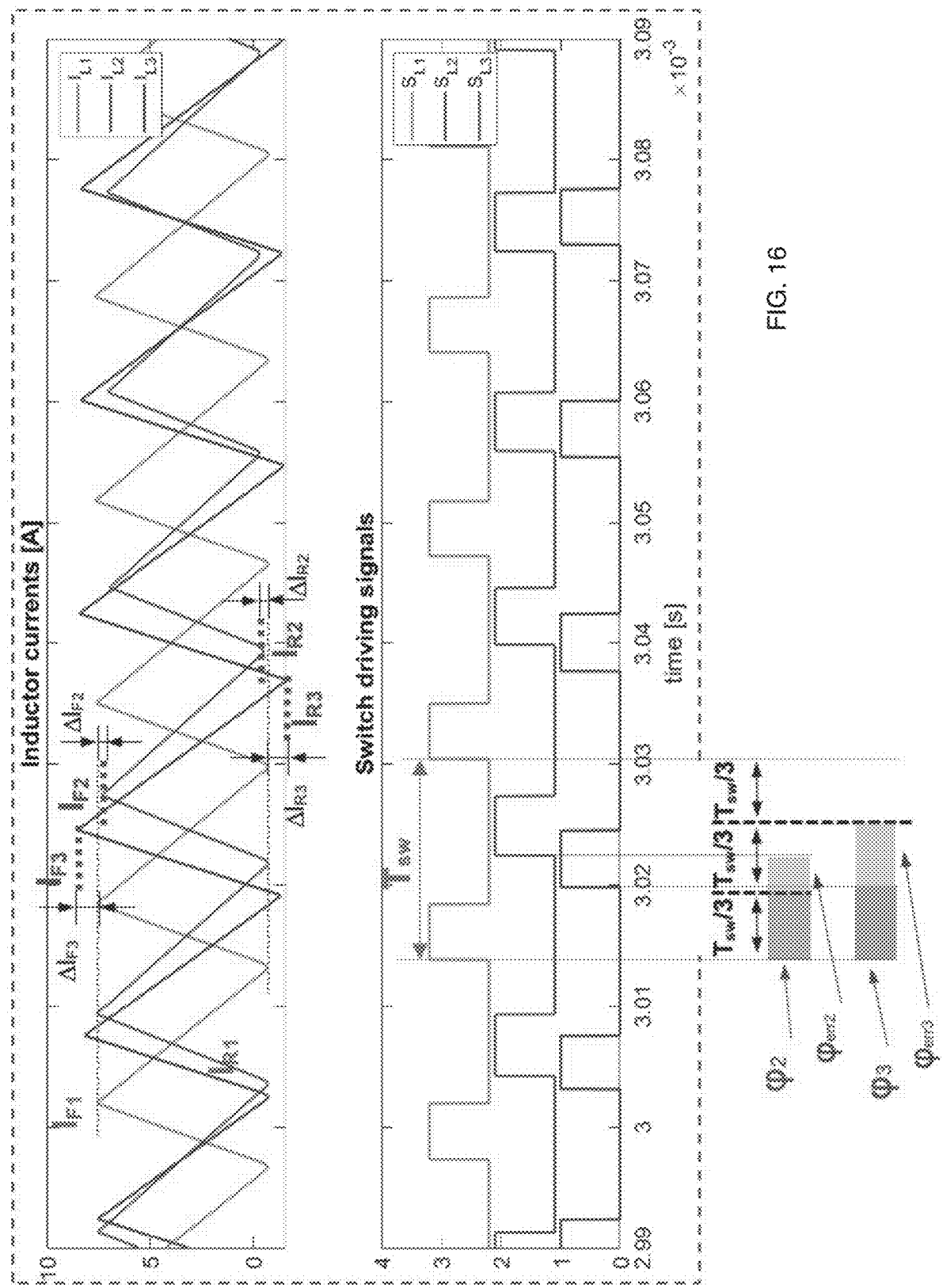
FIG. 16 is a greatly enlarged view of the graph of FIG. 15 during a first period of time.
Figure 17:
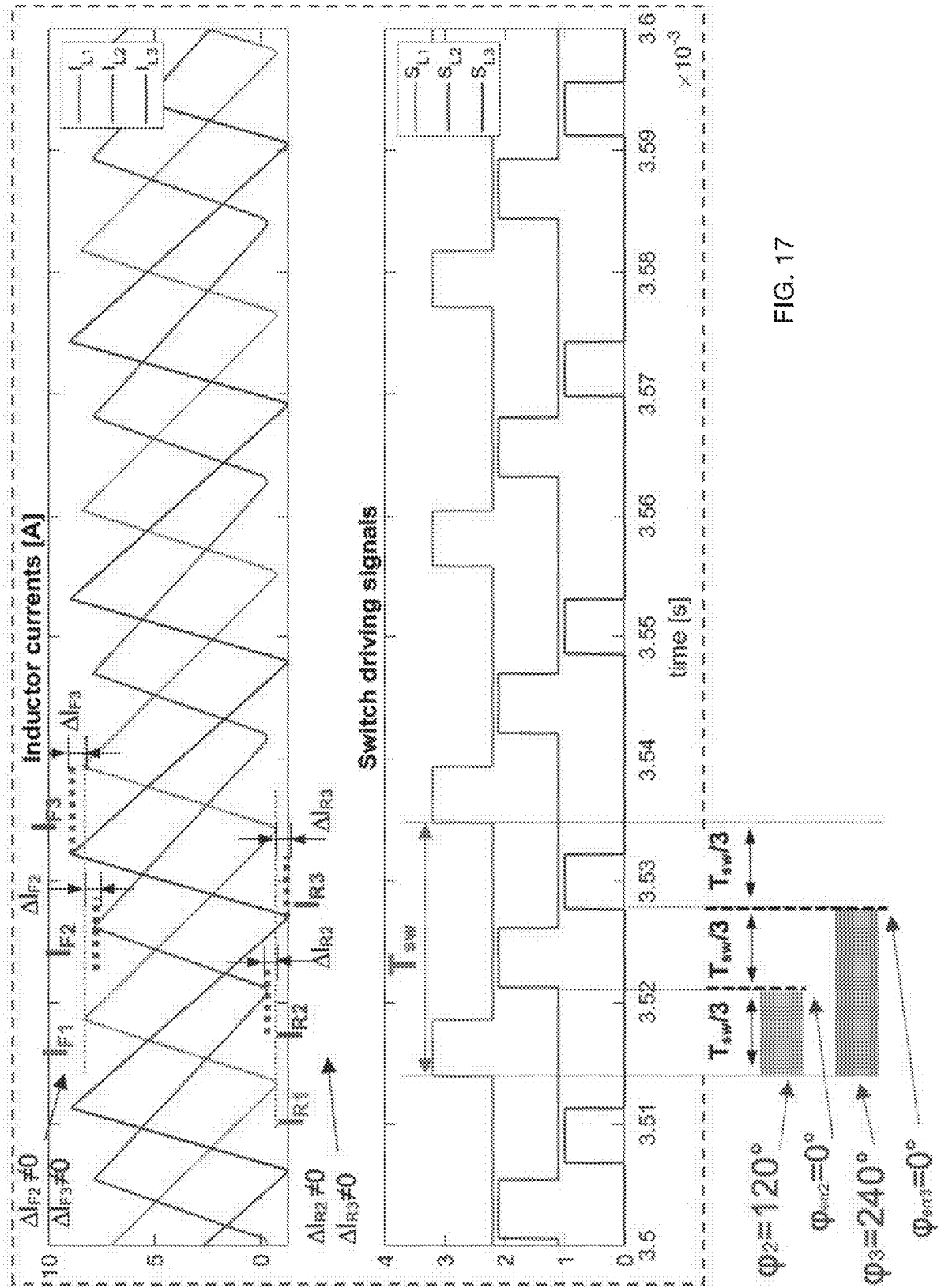
FIG. 17 is a greatly enlarged view of the graph of FIG. 15 during a second period of time.

A greatly enlarged view of the graph of FIG. 15 beginning just prior to 3 ms at which time the controller 20 is activated may be observed in FIG. 16. The phase shifting of the drive signals $S_{L1}$, $S_{L2}$, $S_{L3}$ over time can be observed, beginning where there is not the desired phase difference between the drive signals $S_{L1}$, $S_{L2}$, $S_{L3}$, and ultimately arriving at the state where the desired phase shifts have been accomplished. A greatly enlarged view of the graph of FIG. 15 beginning at time=3.5 ms can be observed in FIG. 17, in which the compensation factors are at different non-zero numbers after the settling time because the inductors L1, L2, L3 are unbalanced.

Figure 18:
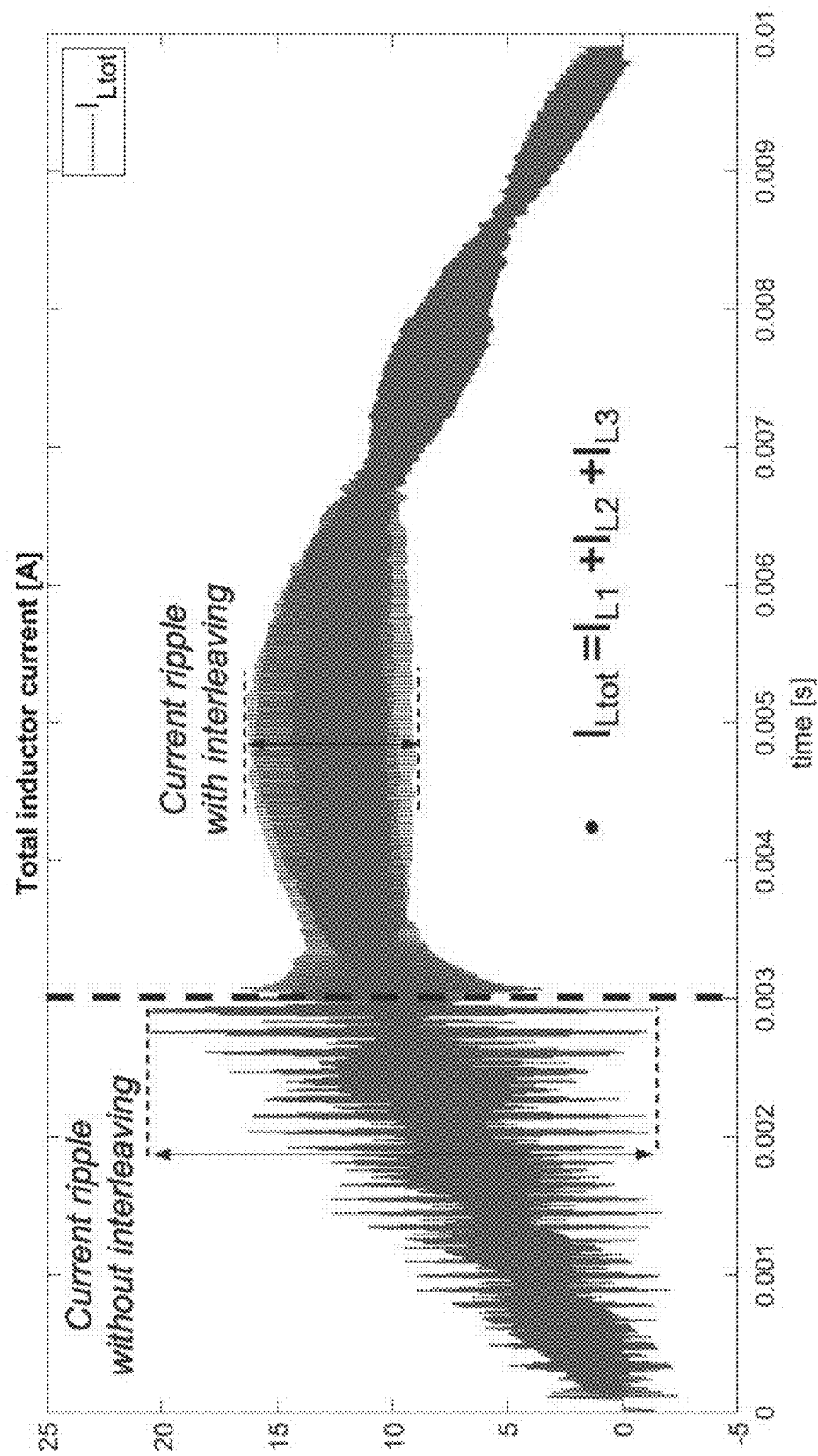
FIG. 18 is a graph showing total inductor current of the interleaved totem-pole PFC circuit of FIG. 2 in the ZVS operation mode when the inductors are imbalanced.

The total inductor current is shown in FIG. 18, wherein the decrease of current ripple due to beginning of the interleaving by activation of the controller 20 at time=3 ms can be seen.

Finally, it is clear that modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A method of performing hysteresis current control on a power factor correction (PFC) circuit, the method comprising:
   supplying a first AC input mains signal to a tap between switches of a first branch of a high-frequency half-bridge, through a first inductor;
   supplying the first AC input mains signal to a tap between switches of a second branch of the high-frequency half-bridge, through a second inductor;
   supplying a second AC input mains signal to a tap between switches of a low-frequency half-bridge;
   generating uncompensated lower reference currents for the first and second branches;
   generating uncompensated upper reference currents for the first and second branches;
   generating a first control signal for the switches of the first branch based upon a comparison between an inductor current through the first inductor and the uncompensated upper and lower reference currents for the first branch;
   generating an additional control signal for the switches of the low-frequency half-bridge;
   generating a first timing reference from the first control signal for the first branch based upon a number of active slave branches, the second branch being a slave branch;
   generating a compensated upper reference current for the second branch by adding a first compensation current to the uncompensated upper reference current for the second branch;
   generating a compensated lower reference current for the second branch by subtracting the first compensation current from the uncompensated lower reference current for the second branch;
   generating a second control signal for the switches of the second branch based upon a comparison between an inductor current through the second inductor and the compensated upper and lower reference currents for the second branch;
   generating a first timing difference based upon a phase difference between the first control signal for the first branch and the second control signal for the second branch; and
   generating the first compensation current based upon a difference between the first timing reference and the first timing difference.

2. The method of claim 1, wherein the first timing reference is indicative of three hundred and sixty degrees divided by the number of active slave branches.

3. The method of claim 1, further comprising:
   supplying the first AC input mains signal to a tap between switches of a third branch of the high-frequency half-bridge, through a third inductor;
   generating uncompensated lower and upper reference currents for the third branch of the high-frequency half-bridge;
   generate a second timing reference from the control signal for the first branch based upon the number of active slave branches, wherein the third branch is a slave branch;
   generate a compensated upper reference current for the third branch by adding a second compensation current to the uncompensated upper reference current for the third branch;
   generate a compensated lower reference current for the third branch by subtracting the second compensation current from the uncompensated lower reference current for the third branch;
   generate a third control signal for the switches of the third branch based upon a comparison between an inductor current through the third inductor and the compensated upper and lower reference currents for the third branch;
   generate a second timing difference based upon a phase difference between the first control signal for the first branch and the third control signal for the third branch; and generate the second compensation current based upon a difference between the second timing reference and the second timing difference.

4. A power factor correction (PFC) circuit, comprising:
a first inductor coupled between a first AC voltage input mains terminal and a first node, and a second inductor coupled between the first AC voltage input mains terminal and a second node, with a second AC voltage input mains terminal coupled to a fourth node;
a first inductor current sensor coupled between the first AC voltage input mains terminal and the first inductor to thereby sense an inductor current in the first inductor, and a second inductor current sensor coupled between the first AC voltage input mains terminal and the second inductor to thereby sense an inductor current in the second inductor;
a low-frequency half-bridge coupled between first and second outputs, with a tap of the low-frequency half-bridge being the fourth node;
a high-frequency half-bridge including:
a first branch coupled between the first and second outputs, with a tap of the first branch being the first node; and
a second branch coupled between the first and second outputs, with a tap of the second branch being the second node;
an output capacitor coupled between the first and second outputs; and
a controller configured to:
generate uncompensated lower reference currents for the first and second branches, and generate uncompensated upper reference currents for the first and second branches;
generate a first control signal for the first branch based upon a comparison between the inductor current in the first inductor and the uncompensated upper and lower reference currents for the first branch;
generate a first timing reference from the first control signal for the first branch based upon a number of active slave branches, wherein the second branch is a slave branch;
generate a compensated upper reference current for the second branch by adding a first compensation current to the uncompensated upper reference current for the second branch;
generate a compensated lower reference current for the second branch by subtracting the first compensation current from the uncompensated lower reference current for the second branch;
generate a second control signal for the second branch based upon the compensated upper and lower reference current for the second branch;
generate a first timing difference based upon a phase difference between the first control signal for the first branch and the second control signal for the second branch;
generate the first compensation current based upon a difference between the first timing reference and the first timing difference; and
generate an additional control signal for switches of the low-frequency half-bridge.

5. The PFC circuit of claim 4, wherein the first timing reference is indicative of three hundred and sixty degrees divided by the number of active slave branches.

6. The PFC circuit of claim 4,
further comprising a third inductor coupled between the first AC voltage input mains terminal and a third node;
further comprising a third inductor current sensor coupled between the first AC voltage input mains terminal and the third inductor to thereby sense an inductor current in the third inductor;
wherein the high-frequency half-bridge further includes a third branch coupled between the first and second outputs, with a tap of the third branch being the third node;
wherein the controller is further configured to:
generate uncompensated lower and upper reference currents for the third branch;
generate a second timing reference from the control signal for the first branch based upon the number of active slave branches, wherein the third branch is a slave branch;
generate a compensated upper reference current for the third branch by adding a second compensation current to the uncompensated upper reference current for the third branch;
generate a compensated lower reference current for the third branch by subtracting the second compensation current from the uncompensated lower reference current for the third branch;
generate a third control signal for the third branch based upon the compensated upper and lower reference currents for the third branch;
generate a second timing difference based upon a phase difference between the first control signal for the first branch and the third control signal for the third branch; and
generate the second compensation current based upon a difference between the second timing reference and the second timing difference.

7. The PFC circuit of claim 6, wherein the controller includes an adaptive phase-shift reference generation circuit configured to generate the first timing reference from the control signal for the second branch based upon the number of active slave branches and generate the second timing reference from the control signal for the third branch based upon the number of active slave branches.

8. The PFC circuit of claim 4, wherein the controller includes a phase shift detection circuit comprising:
an SR flip flop having a set input receiving the first control signal and a reset input receiving the second control signal; and
a filter coupled to receive output of the SR flip flop as input and apply a filtering function thereto in order to produce the first timing difference as a first timing difference voltage.

9. The PFC circuit of claim 8, wherein the filter comprises first and second series connected resistors coupled between an output of the SR flip flop and a non-inverting input terminal of a first amplifier, with a first capacitor coupled between a tap between the first and second series connected resistors and an output of the first amplifier, with a second capacitor coupled between the non-inverting input terminal of the first amplifier and ground, and with an inverting input terminal of the first amplifier being coupled to the output of the first amplifier directly or through additional resistors.

10. The PFC circuit of claim 8, wherein the first timing reference is a first timing reference voltage; and wherein the controller includes a differential amplifier circuit configured to determine the difference between the first timing reference voltage and the first timing difference voltage.

11. The PFC circuit of claim 10, wherein the differential amplifier circuit comprises:

a third resistor coupled between an output of the filter and an inverting input terminal of a second amplifier;

a fourth resistor coupled between the inverting input terminal of the second amplifier and an output of the second amplifier;

a fifth resistor coupled between the first timing reference voltage and a non-inverting input terminal of the second amplifier; and a sixth resistor coupled between an offset voltage and the non-inverting input terminal of the second amplifier.

12. The PFC circuit of claim 7, wherein the controller includes an upper threshold comparison circuit configured to generate the compensated upper reference voltage for the second branch by adding a voltage representative of the first compensation current to a voltage representative of the uncompensated upper reference current for the second branch.

13. The PFC circuit of claim 12, wherein the upper threshold comparison circuit comprises:

a thirteenth resistor coupled between the uncompensated upper reference voltage and a non-inverting input terminal of a third amplifier;

a fourteenth resistor coupled between the first compensation voltage and the non-inverting input terminal of the third amplifier;

a fifteenth resistor coupled between an offset voltage and an inverting input terminal of the third amplifier; and a sixteenth resistor coupled between the inverting input terminal and an output of the third amplifier.

14. The PFC circuit of claim 8, wherein the controller includes a lower threshold comparison circuit configured to generate the compensated lower reference voltage for the second branch by subtracting a voltage representative of the first compensation current from a voltage representative of the uncompensated lower reference current for the second branch.

15. The PFC circuit of claim 14, wherein the lower threshold comparison circuit comprises:

a seventeenth resistor coupled between an offset voltage and an inverting input terminal of a fourth amplifier;

an eighteenth resistor coupled between the first compensation voltage and the inverting input terminal of the fourth amplifier;

a nineteenth resistor coupled between the uncompensated lower reference voltage and a non-inverting input terminal of the fourth amplifier;

a twentieth resistor coupled between the offset voltage and the non-inverting input terminal of the fourth amplifier; and a twenty first resistor coupled between the inverting input terminal and an output of the fourth amplifier.

16. The PFC circuit of claim 8, wherein the controller includes an adaptive phase-shift reference generation circuit configured to generate the first timing reference voltage from the control signal for the first branch based upon the number of active slave branches.

17. The PFC circuit of claim 16, wherein the adaptive phase-shift reference generation circuit includes a channel selection circuit and a reference voltage generation circuit, wherein the channel selection circuit selectively connects resistors of a ladder within the reference voltage generation circuit to ground based upon the number of active slave branches.

18. The PFC circuit of claim 17, wherein the reference voltage generation circuit comprises:

a first reference resistor connected between a supply voltage and a first reference voltage generation circuit node;

a first switch that selectively connects the first reference voltage generation circuit node to ground based upon output from the channel selection circuit; and a second reference resistor connected between the first reference voltage generation circuit node and ground.

19. The PFC circuit of claim 18, wherein the channel selection circuit comprises:

a first selection resistor connected between ground and a first selection node, and a second selection resistor connected between the first selection node and a supply voltage; and a comparator having an inverting input terminal coupled to a voltage indicative of the number of active slave branches, a non-inverting input terminal coupled to the first selection node, and an output connected to control the first switch of the reference voltage generation circuit.

20. A method of performing hysteresis current control on a power factor correction (PFC) circuit, the method comprising:

supplying a first AC input mains signal to N taps through N respective inductors, each tap being between switches of a different one of N branches of a high-frequency half-bridge, wherein N is an integer that is greater than or equal to two;

supplying a second AC input mains signal to a tap between switches of a low-frequency half-bridge;

generating uncompensated lower reference currents for the N branches;

generating uncompensated upper reference currents for the N branches;

generating a first control signal for the switches of a first of the N branches, the first control signal being based upon a comparison between an inductor current through a first of the N inductors and firsts of the N uncompensated upper and lower reference currents;

generating an additional control signal for the switches of the low-frequency half-bridge;

generating a first timing reference from the first control signal based upon a number of active slave branches, the branches of the N branches other than the first branch being slave branches; and for each slave branch:

generating a compensated upper reference current by adding a respective compensation current to the uncompensated upper reference current for that slave branch, and generating a compensated lower reference current by subtracting the compensation current from the uncompensated lower reference current for that slave branch, wherein the control signal for that slave branch is generated based upon a comparison between an inductor current through an associated one of the N inductors and the compensated upper and lower reference currents for that slave branch;

generating a timing difference based upon a phase difference between the first control signal and the control signal for that slave branch; and generating the compensation current based upon a difference between the first timing reference and the timing difference.

* * * * *